US009975242B1

(12) United States Patent
Stubbs et al.

(10) Patent No.: US 9,975,242 B1
(45) Date of Patent: *May 22, 2018

(54) FEATURE IDENTIFICATION AND EXTRAPOLATION FOR ROBOTIC ITEM GRASPING

(71) Applicant: Amazon Technologies, Inc., Seattle, WA (US)

(72) Inventors: Andrew Stubbs, Waltham, MA (US); Andrew D. Marchese, Concord, MA (US); John Gregory Longtine, Sudbury, MA (US); Sarath Krishnaswamy, Dunstable, MA (US); Moses Theodore Ort, Lakewood, NJ (US); Russell Charles Toris, San Jose, CA (US); Jacob Taylor Wachlin, Arlington Heights, IL (US)

(73) Assignee: Amazon Technologies, Inc., Seattle, WA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/604,579

(22) Filed: May 24, 2017

Related U.S. Application Data

(63) Continuation of application No. 14/966,912, filed on Dec. 11, 2015, now Pat. No. 9,694,494.

(51) Int. Cl.
*G05B 15/00* (2006.01)
*B25J 9/16* (2006.01)

(52) U.S. Cl.
CPC ............ *B25J 9/1612* (2013.01); *Y10S 901/32* (2013.01); *Y10S 901/46* (2013.01)

(58) Field of Classification Search
CPC combination set(s) only.
See application file for complete search history.

(56) References Cited

U.S. PATENT DOCUMENTS

| 4,302,138 | A | | 11/1981 | Zarudiansky et al. |
| 4,367,891 | A | * | 1/1983 | Wauer ................. B25J 15/0009 269/266 |
| 4,575,297 | A | | 3/1986 | Richter |

(Continued)

OTHER PUBLICATIONS

U.S. Appl. No. 14/966,912, "Feature Identification and Extrapolation for Robotic Item Grasping", filed Dec. 11, 2015.

(Continued)

*Primary Examiner* — Jonathan L Sample
(74) *Attorney, Agent, or Firm* — Kilpatrick Townsend & Stockton LLP

(57) ABSTRACT

A grasp management system and corresponding methods are described. In some examples, information about a grasp by which an end of arm tool of a robotic manipulator successfully grasped an item is accessed. The grasp may be associated with contact points on the item. Other contact points may be simulated based on the contact points in order to define a grasping surface that includes at least a portion of the other contact points. Information about the grasping surface may be accessed to determine a primitive shape that represents a feature of the item. The primitive shape may be used determine other features on the item or other features on other items that may also be graspable by the end of arm tool or other end of arm tools.

20 Claims, 13 Drawing Sheets

(56) References Cited

U.S. PATENT DOCUMENTS

| | | | |
|---|---|---|---|
| 4,623,183 A | 11/1986 | Aomori et al. | |
| 4,632,444 A * | 12/1986 | Martinez | B25J 13/084 294/104 |
| 4,783,107 A | 11/1988 | Parker et al. | |
| 4,921,293 A * | 5/1990 | Ruoff | A61F 2/583 294/106 |
| 4,957,320 A * | 9/1990 | Ulrich | B25J 9/102 192/56.1 |
| 4,980,626 A * | 12/1990 | Hess | B25J 9/1005 250/559.33 |
| 5,004,391 A | 4/1991 | Burdea | |
| 5,108,140 A * | 4/1992 | Bartholet | B25J 15/0009 294/106 |
| 5,172,951 A * | 12/1992 | Jacobsen | A61F 2/588 294/104 |
| 5,280,265 A | 1/1994 | Kramer et al. | |
| 5,437,490 A | 8/1995 | Mimura et al. | |
| 5,501,498 A * | 3/1996 | Ulrich | B25J 9/102 294/106 |
| 5,548,667 A | 8/1996 | Tu et al. | |
| 5,631,861 A | 5/1997 | Kramer et al. | |
| 5,748,854 A | 5/1998 | Watanabe et al. | |
| 5,762,390 A * | 6/1998 | Gosselin | B25J 15/0009 294/106 |
| 5,967,580 A * | 10/1999 | Rosheim | B25J 3/04 294/106 |
| 6,016,385 A | 1/2000 | Yee et al. | |
| 6,042,555 A | 3/2000 | Kramer et al. | |
| 6,517,132 B2 * | 2/2003 | Matsuda | B25J 15/0009 294/106 |
| 6,565,563 B1 | 5/2003 | Agee et al. | |
| 6,701,296 B1 | 3/2004 | Kramer et al. | |
| 6,817,641 B1 * | 11/2004 | Singleton, Jr. | B25J 9/102 294/106 |
| 6,924,787 B2 | 8/2005 | Kramer et al. | |
| 7,168,748 B2 * | 1/2007 | Townsend | B25J 9/1612 294/106 |
| 7,289,884 B1 * | 10/2007 | Takahashi | B25J 9/1612 318/568.12 |
| 7,340,100 B2 * | 3/2008 | Higaki | G06F 3/017 382/199 |
| 7,549,688 B2 * | 6/2009 | Hayakawa | B25J 9/0009 294/106 |
| 7,816,128 B2 * | 10/2010 | Nakashima | C12M 23/50 435/286.2 |
| 7,862,522 B1 | 1/2011 | Barclay et al. | |
| 7,877,165 B2 | 1/2011 | Sugiyama et al. | |
| 8,255,079 B2 | 8/2012 | Linn et al. | |
| 8,280,837 B2 * | 10/2012 | Platt | B25J 9/1612 294/110.1 |
| 8,297,672 B2 * | 10/2012 | Kim | B25J 9/104 294/106 |
| 8,346,393 B2 * | 1/2013 | Kim | B25J 9/1612 700/261 |
| 8,350,806 B2 | 1/2013 | Nagasaka et al. | |
| 8,364,314 B2 * | 1/2013 | Abdallah | H01R 13/17 700/264 |
| 8,463,434 B2 * | 6/2013 | Takahashi | B25J 9/1612 318/568.16 |
| 8,467,903 B2 | 6/2013 | Linn et al. | |
| 8,483,880 B2 | 7/2013 | De La Rosa Tames et al. | |
| 8,483,882 B2 * | 7/2013 | Abdallah | H01R 13/17 700/245 |
| 8,504,198 B2 * | 8/2013 | Takahashi | B25J 9/1612 700/245 |
| 8,622,452 B2 * | 1/2014 | Yamaguchi | B25J 15/0028 294/106 |
| 8,660,685 B2 * | 2/2014 | Irie | B25J 9/1687 414/730 |
| 9,122,275 B2 | 9/2015 | Kim et al. | |
| 9,149,928 B2 * | 10/2015 | Yamaguchi | B25J 9/043 |
| 9,321,176 B1 * | 4/2016 | Sun | B25J 9/1612 |
| 9,333,648 B2 | 5/2016 | Shim et al. | |
| 9,333,649 B1 * | 5/2016 | Bradski | B25J 9/163 |
| 9,381,645 B1 * | 7/2016 | Yarlagadda | G05B 19/42 |
| 9,383,895 B1 | 7/2016 | Liu et al. | |
| 9,545,717 B2 | 1/2017 | Kim et al. | |
| 9,694,494 B1 * | 7/2017 | Stubbs | B25J 9/1612 |
| 2004/0028260 A1 * | 2/2004 | Higaki | G06F 3/017 382/118 |
| 2004/0266276 A1 | 12/2004 | Hariki et al. | |
| 2005/0125099 A1 * | 6/2005 | Mikami | G06N 3/008 700/245 |
| 2006/0012198 A1 * | 1/2006 | Hager | B25J 9/1612 294/106 |
| 2006/0128316 A1 * | 6/2006 | Moller | G09B 23/32 455/67.15 |
| 2007/0010913 A1 * | 1/2007 | Miyamoto | B25J 9/1658 700/264 |
| 2007/0018470 A1 * | 1/2007 | Hayakawa | B25J 9/0009 294/106 |
| 2007/0078564 A1 | 4/2007 | Hoshino et al. | |
| 2007/0152619 A1 | 7/2007 | Sugiyama et al. | |
| 2007/0219668 A1 * | 9/2007 | Takahashi | B25J 9/1612 700/249 |
| 2007/0236162 A1 * | 10/2007 | Kawabuchi | B25J 9/102 318/568.16 |
| 2007/0282485 A1 | 12/2007 | Nagatsuka et al. | |
| 2008/0077361 A1 * | 3/2008 | Boyd | B25J 9/1612 702/189 |
| 2008/0114491 A1 * | 5/2008 | Takahashi | B25J 9/1612 700/245 |
| 2008/0204425 A1 | 8/2008 | Nagasaka et al. | |
| 2008/0240889 A1 | 10/2008 | Yokoyama et al. | |
| 2009/0069942 A1 * | 3/2009 | Takahashi | B25J 9/1633 700/260 |
| 2009/0285664 A1 | 11/2009 | Kim et al. | |
| 2009/0302626 A1 * | 12/2009 | Dollar | B25J 9/104 294/106 |
| 2009/0306825 A1 * | 12/2009 | Li | B25J 9/1669 700/261 |
| 2010/0010670 A1 | 1/2010 | Matsukuma et al. | |
| 2010/0011899 A1 * | 1/2010 | Kim | B25J 9/104 74/490.04 |
| 2010/0103106 A1 | 4/2010 | Chui et al. | |
| 2010/0138039 A1 * | 6/2010 | Moon | B25J 9/1612 700/245 |
| 2010/0161130 A1 * | 6/2010 | Kim | B25J 9/1612 700/261 |
| 2010/0176615 A1 | 7/2010 | Okuda et al. | |
| 2010/0215257 A1 | 8/2010 | Dariush et al. | |
| 2010/0280661 A1 * | 11/2010 | Abdallah | H01R 13/17 700/260 |
| 2010/0280663 A1 * | 11/2010 | Abdallah | H01R 13/17 700/264 |
| 2010/0292837 A1 | 11/2010 | Takahashi et al. | |
| 2011/0067521 A1 * | 3/2011 | Linn | B25J 15/0009 74/490.06 |
| 2011/0118877 A1 | 5/2011 | Hwang et al. | |
| 2011/0238213 A1 | 9/2011 | Nagasaka et al. | |
| 2011/0288681 A1 | 11/2011 | Hayakawa et al. | |
| 2012/0078419 A1 | 3/2012 | Kim et al. | |
| 2012/0123589 A1 | 5/2012 | Kim et al. | |
| 2012/0153652 A1 * | 6/2012 | Yamaguchi | B25J 15/0028 294/86.4 |
| 2012/0283875 A1 * | 11/2012 | Klumpp | B25J 9/1648 700/258 |
| 2013/0041502 A1 * | 2/2013 | Shi | B25J 9/1612 700/245 |
| 2013/0057004 A1 | 3/2013 | Murata et al. | |
| 2013/0173055 A1 | 7/2013 | Kim et al. | |
| 2013/0238129 A1 | 9/2013 | Rose et al. | |
| 2014/0163729 A1 * | 6/2014 | Shi | B25J 9/1612 700/245 |
| 2014/0163731 A1 | 6/2014 | Shi et al. | |
| 2014/0226136 A1 | 8/2014 | Gagnon et al. | |
| 2015/0019013 A1 | 1/2015 | Sweda et al. | |
| 2015/0242540 A1 * | 8/2015 | Shapiro | B25J 19/007 703/2 |

(56) References Cited

U.S. PATENT DOCUMENTS

2015/0273688 A1* 10/2015 Harada ............... B25J 9/1612
                                                                            700/259
2015/0290795 A1    10/2015  Oleynik
2016/0058519 A1    3/2016  Herr et al.
2016/0059412 A1    3/2016  Oleynik

OTHER PUBLICATIONS

U.S. Appl. No. 14/966,912, "Notice of Allowance", dated Feb. 28, 2017, 13 pages.
U.S. Appl. No. 14/966,958, "Validation of Robotic Item Grasping", filed Dec. 11, 2015.

* cited by examiner

FEATURE IDENTIFICATION AND EXTRAPOLATION FOR ROBOTIC ITEM GRASPING

CROSS-REFERENCE TO RELATED APPLICATIONS

This application is a continuation of and claims priority to U.S. patent application Ser. No. 14/966,912, filed Dec. 11, 2015, entitled "FEATURE IDENTIFICATION AND EXTRAPOLATION FOR ROBOTIC ITEM GRASPING," the contents of which are incorporated herein by reference.

This application is related to and incorporates by reference for all purposes the full disclosure of co-pending U.S. patent application Ser. No. 14/966,958, filed, Dec. 11, 2015 entitled "VALIDATION OF ROBOTIC ITEM GRASPING."

BACKGROUND

Many modern day industries are beginning to rely more and more on robotic manipulators such as robotic arms. Such robotic manipulators may function to increase repeatability of tasks, increase efficiency of production lines, and bring other benefits to their operators. These benefits may be especially realized when the robotic manipulators are instructed to perform tasks under the same conditions. For example, a robotic manipulator may be instructed to identify a particular object having a fixed orientation within a box and grasp the object using an arm tool of the robotic manipulator. If the object is not in the fixed orientation, however, the robotic manipulator may be unable to grasp the object. Because of this, other systems that rely on the object being removed may be impacted and the benefits of the robotic manipulator may be minimized.

BRIEF DESCRIPTION OF THE DRAWINGS

Various embodiments in accordance with the present disclosure will be described with reference to the drawings, in which.

DETAILED DESCRIPTION

Figure 1:
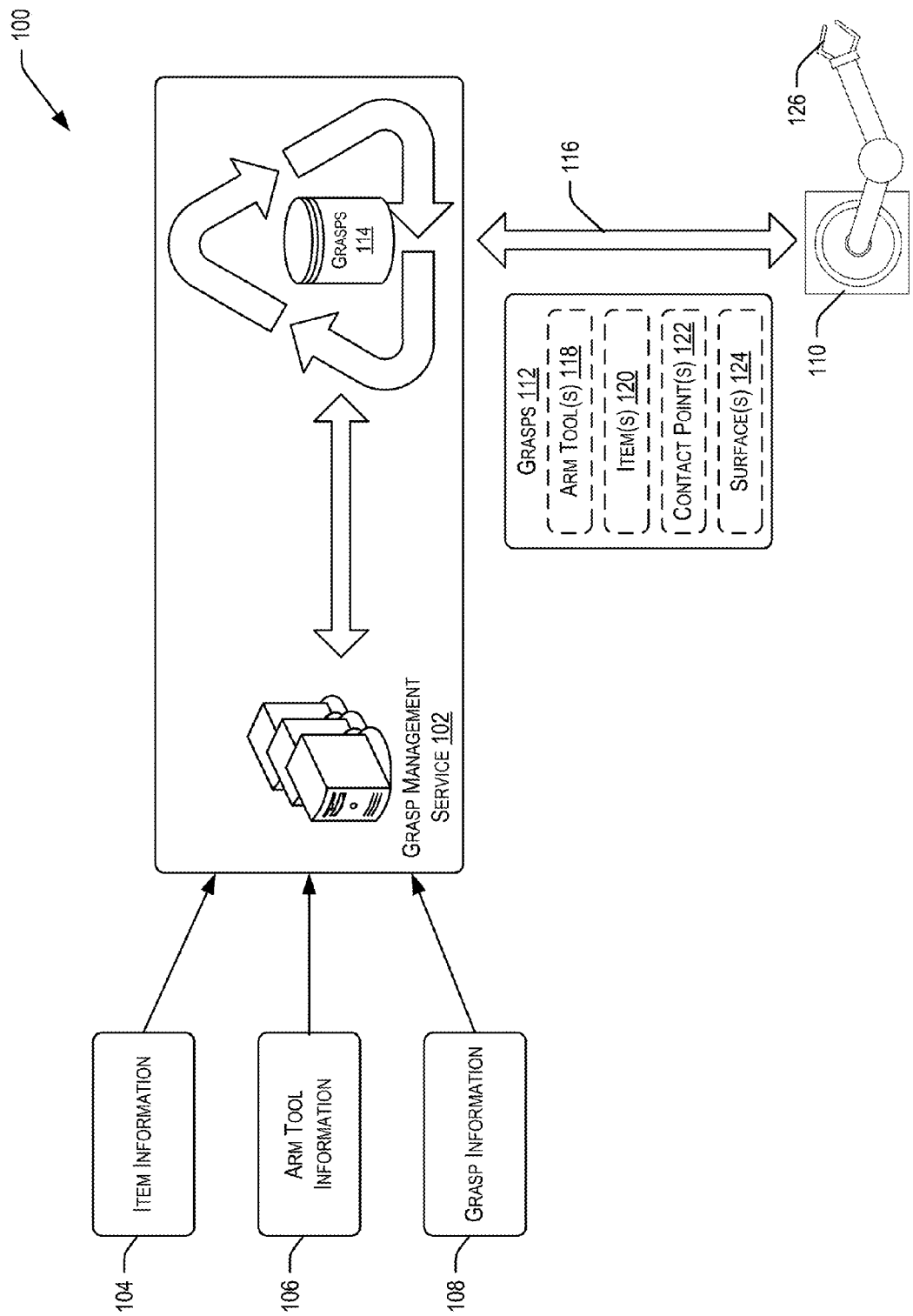
FIG. 1 is an example diagram depicting techniques relating to generating and validating grasp sets for robotic manipulators as described herein, according to at least one example.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments herein are directed to a grasp management system and techniques for generating grasp sets and validating grasp sets. A grasp may include information to cause a robotic manipulator to control an end of arm tool to pick up or move an item. To this end, a grasp may identify one or more contact points on the item and a grasping function for the end of arm tool to use to manipulate the item (e.g., move the item or pick the item up). Grasp sets can be taught to a robotic manipulator by a human operator in a simulation environment or in an actual environment. The information associated with these taught grasps (e.g., contact points on the item where the end of arm tool contacted the item, the type end of arm tool used, orientation of the item, orientation of the end of arm tool, grasping function used, and other information) can be saved as predictably successful grasps and later validated by the robotic manipulator to define feasible grasps. The predictably successful grasps may also be used by the robotic manipulator to determine how to grasp items in the future when it encounters similar conditions (e.g., item size, orientation, type of end of arm tool, and other conditions).

In some examples, techniques described herein utilize these taught grasps to generate other grasp sets that can be used by other robotic manipulators using different end of arm tools to grasp other items. For example, a set of contact points on an item corresponding to a taught grasp can be expanded in simulation to include other feasible contact points. In some examples, simulation may include determining the other feasible contact points analytically. This expansion can take into account the geometry of the original end of arm tool used. A known geometry of a new end of arm tool can be compared to the geometry of the original end of arm tool to identify which of the other feasible contact points would also be feasible for the new end of arm tool. The taught grasps may also be expanded by identifying features of the item used during the teaching that can be generalized to other features of the same item or other items. Characteristics of the taught grasp relating to a feature of the item where the contact points are located can be utilized to identify similar features on the item or similar features on other items.

In a particular example, a human may operate a robotic arm to cause a two-pronged grabber to pick up a teddy bear by an arm of the teddy bear. Information describing movement of the robotic arm and locations on the arm of the teddy bear can be recorded as a taught grasp. A grasp management service may access a three-dimensional model of the teddy bear to determine a basic shape such as a cylinder that corresponds to the shape of the arm. This basic shape can be selected from a set of basic shapes that can easily be compared to other basic shapes. The grasp management service may search for other features of the teddy bear that also have features that are shaped similar to the cylinder (e.g., the other arm and the legs). Once identified, information about these other features can be saved and used in the future to generate other grasps for the two-pronged grabber to pick up the teddy bear by the other arm or one of the legs, instead of the arm that was used in the original example. This information may also be extrapolated to other end of arm tools (e.g., a two-pronged grabber) to pick up the teddy bear or other items with cylindrical features. For example, the grasp management service may search other models of other items in a database to identify features of those items that are shaped similar to the cylinder. Once identified, grasps can be generated to pick up these other items using any of the analyzed end of arm tools and based on the characteristics of the original taught grasp.

Referring now to the figures in which like-referenced numerals and/or names may refer to like elements, FIG. 1 illustrates a diagram 100 including a grasp management service 102. The grasp management service 102 as described in more detail herein may be configured to implement the techniques relating to generating and validating grasp sets. To this end, the grasp management service 102 may receive item information 104, arm tool information 106, and grasp information 108. The item information 104 may include information about items that a robotic manipulator 110 such as a robotic arm may be capable of manipulating (e.g., picking up or moving in some manner). The arm tool information 106 may include information about different arms tools that can be used by the robotic manipulator 110 to grasp the items identified by the item information 104. The grasp information 108 may include information about grasps that can be attempted by the arm tools identified by the arm tool information 106 to grasp the items identified by the item information 104. In some examples, the grasp information 108 may include grasps that are taught by human operators or determined in some other manner. The grasps may be associated with certain arm tools and items identified by the arm tool information 106 and the item information 104.

The grasp management service 102 may utilize the information 104-108 to generate and validate grasps 112. The grasps 112 may be saved in a grasp database 114 or other comparable structure associated with the grasp management service 102. Generating the grasps 112 may include expanding a basic set of grasps to include predictive grasps. These predictive grasps and the basic set of grasps can be tested using the robotic manipulator 110 or using a simulation environment that simulates the function of the robotic manipulator 110 or analyzes the predictive grasps and the basic set of grasps analytically. Information about the grasps 112 can be provided to the robotic manipulator 110, as illustrated by arrow 116. This information can include arm tool information 118, item information 120, contact point information 122, and surface information 124 related to the grasps 112. For example, the arm tool information 118 may indicate which arm tools have been used or could be used to execute the grasps 112. Likewise, the item information 120 may indicate which items and item features have been used or could be used to execute the grasps 112. The contact point information 122 may indicate contact points on the items 120 and/or features of the items 120 that have been used or could be used to execute the grasps 112. The surface information 124 may indicate surfaces on the items 120, which include one or more contact points 122 and which have been used or could be used to execute the grasps 112.

Additional grasps 112 may be generated in a manner that expands any one of the arm tool information 118, the item information 120, the contact point information 122, or the surface information 124. For example, a particular grasp 112 that was developed using arm tool A to grasp item X, can be expanded to include using arm tool B to grasp item X, or to include using arm tool A to grasp item Y. In some examples, expanding the grasps 112 may be performed by the grasp management service 102 in a manner that is disconnected from the hardware on which initial grasps 112 were generated. This may be desirable to generate grasps 112 for a wide variety of items such as inventory items in a large-scale inventory system.

In order to expand the grasps 112 and/or to validate the grasps 112, the robotic manipulator 110 may be configured to receive the grasps 112 from the grasp management service 102 and attempt to execute the grasps 112, as illustrated by the arrow 116. In some examples, the attempts made by the robotic manipulator 110 are made under test conditions, in a simulation environment, analytically, or under actual operating conditions. In any event, in addition to the grasps 112 or together with the grasps 112, the grasp management service 102 may provide instructions to the robotic manipulator 110 regarding how to attempt to execute the grasps 112. For example, the instructions may include computer executable instructions that a processor associated with the robotic manipulator 110 can execute. These instructions may instruct the robotic manipulator 110 to identify a test item, attempt to pick up the test item using an end of arm tool 126, which may be identified by the arm tool information 118. The instructions may further instruct the robotic manipulator 110 to record and/or transmit certain information such as success rates for each grasp from the grasps 112.

Information gathered while testing and/or validating grasps (e.g., executing the grasps 112 by the robotic manipulator 110) can be provided back to the grasp management service 102, as illustrated by the arrow 116. This information can include whether the robotic manipulator 110 was able to pick up the item, locations on the item where an end of arm tool 126 of the robotic manipulator 110 contacted the item, success rates for multiple attempted grasps, orientation information relating to an orientation of the item or an orientation of the end of arm tool 126 with respect to the item, and any other suitable information. At least a portion of this information may be used by the grasp management service 102 to determine a richness measure for the grasps 112, which may be larger or smaller than when provided to the robotic manipulator 110. The richness measure may represent a spatial variation of grasping locations (e.g., contact points where an end of arm tool has successfully grasped the item) with respect to surface area of the item. For example, an item that has many possible grasping locations along a top surface can be said to have a high richness measure with respect to the top surface. The grasp management service 102 may also use at least a portion of this information to validate grasps for different end of arm tools. For example, a set of grasps developed for a first end of arm tool may be validated for a second end of arm tool. In this manner, it may be determined which of the end of arm tools is better suited for picking up the item.

Figure 2:
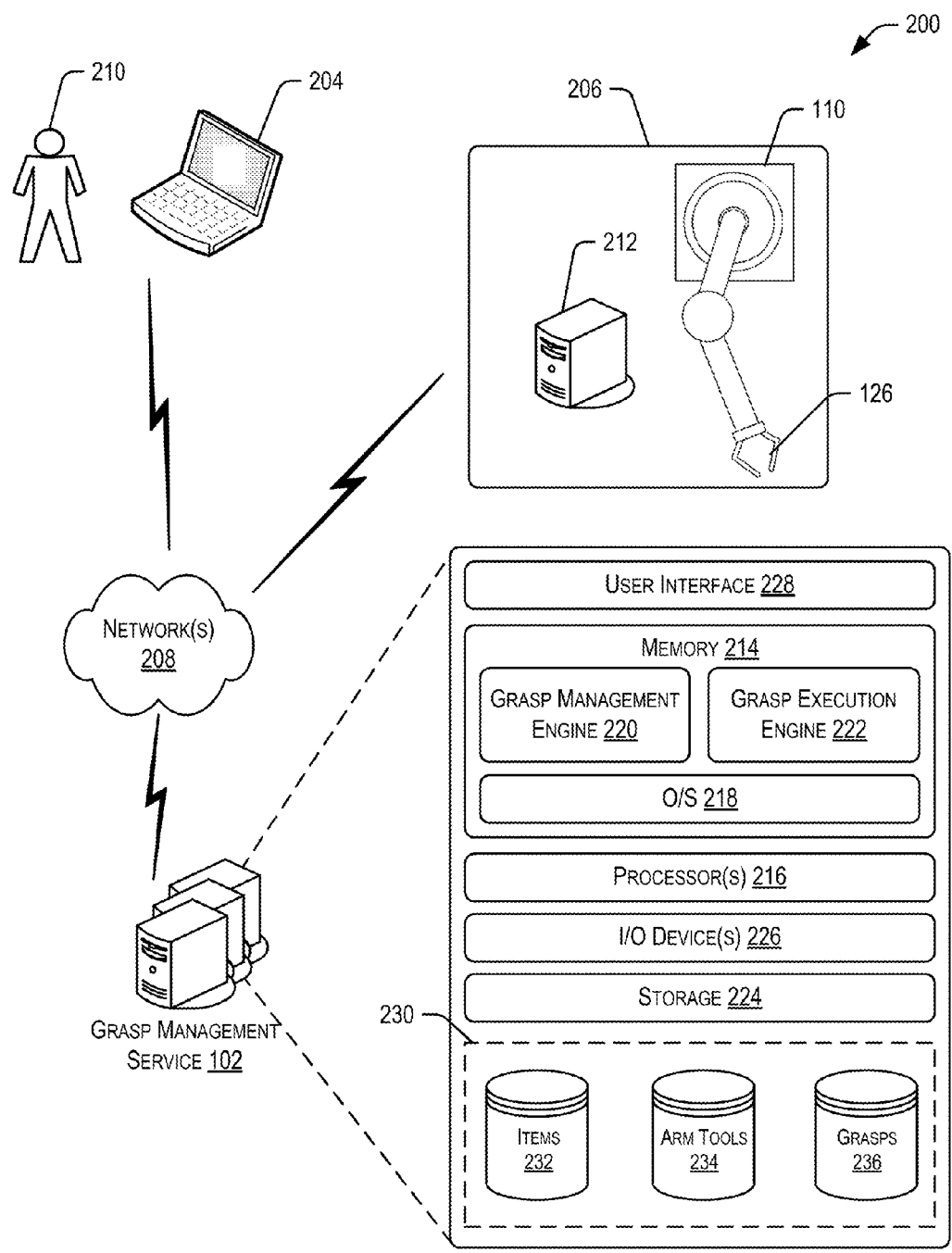
FIG. 2 is an example schematic architecture for implementing techniques relating to generating and validating grasp sets for robotic manipulators as described herein, according to at least one example.

FIG. 2 illustrates an example architecture 200 for implementing techniques relating generating grasp sets and validating grasp sets as described herein. The architecture 200 may include the grasp management service 102 in communication with a user device 204 and a manipulator system 206 via one or more networks 208 (hereinafter, "the network 208"). The user device 204 may be operable by a user 210 to interact with the grasp management service 102 and/or the manipulator system 206. The manipulator system 206 may include the robotic manipulator 110 and a management device 212. The user 210 may use the user device 204 to connect to and control the robotic manipulator 110, for example, to teach the robotic manipulator 110 to pick up an item. In some examples, the grasp management service 102 provides a user interface that enables the user 210 utilizing the user device 204 to operate the robotic manipulator 110. The network 208 may include any one or a combination of many different types of networks, such as cable networks, the Internet, wireless networks, cellular networks, and other private, and/or public networks.

The user device 204 may be any suitable type of computing device such as, but not limited to, a tablet, a mobile phone, a smart phone, a personal digital assistant (PDA), a laptop computer, a desktop computer, a thin-client device, a tablet computer, or any other suitable device capable of communicating with the grasp management service 102 and/or the manipulator system 206 via the network 208 in accordance with techniques described herein.

As introduced above, the manipulator system 206 may include the management device 212 in electrical and/or network communication with the robotic manipulator 110. The robotic manipulator 110 may include any suitable type and number of sensors disposed throughout the robotic manipulator 110 (e.g., sensors in the base, in the arm, in joints in the arm, in the end of arm tool 126, or in any other suitable location). The sensors can include sensors configured to detect pressure, force, weight, light, objects, slippage, and any other information that may be used to control and/or monitor the operation of the robotic manipulator 110, including the end of arm tool 126. The sensors may be in communication with the management device 212. In this manner, the management device 212 may control the operation of the robotic manipulator 110 and the end of arm tool 126 based at least in part on sensing information received from the sensors. The sensing information may also be used as feedback to adjust the grasps used by the end of arm tool 126, and to generate new grasps, to validate grasps, and to determine quality values for grasps, which may be a numerical value based at least in part on one or more objective factors.

The management device 212 may be configured to receive instructions from the grasp management service 102 and/or the user device 204 in order to control operations of the robotic manipulator 110. In some examples, the management device 212 manages the operation of the robotic manipulator 110 autonomously or semi-autonomously. For example, the management device 212 may receive a set of grasps from the grasp management service 102 and test the grasps without further instructions from the grasp management service 102. In some examples, the results of this test and any new grasps identified can be provided back to the grasp management service 102 for further generation and/or validation of the set.

The grasp management service 102 may include one or more service provider computers, perhaps arranged in a cluster of servers or as a server farm, and may host web service applications. These servers may be configured to perform computing operations as described herein. In some examples, the servers (and the components thereof) may be distributed throughout more than one location. The servers may also be virtual computing resources. The grasp management service 102 may be implemented as part of an inventory management system that is associated with an electronic marketplace. Through the electronic marketplace users may place orders for items. In response, the inventory management system may determine shipping instructions for retrieving the items from their physical storage locations and coordinating their shipping. In some examples, the shipping instructions may be based on the inventory packing instructions described herein. For example, a retrieval portion of the shipping instructions may include an inventory mapping of the packing locations for the items. The retrieval portion may be provided to the manipulator system 206 for retrieval of the items. For example, the items may be retrieved from a bin of items. As the manipulator system 206 retrieves items as part of customer orders or otherwise, success metrics may be gathered and used to improve the set of grasps attempted by the robotic manipulator 110 as part of retrieving the items or otherwise operating under actual operating conditions. In some examples, the grasp management service 102 may be implemented as a service within the inventory management system. In this manner the grasp management service 102 can access components of the inventory management system and easily share information with the inventory management system.

The grasp management service 102 may include at least one memory 214 and one or more processing units (or processor(s)) 216. The processor 216 may be implemented as appropriate in hardware, computer-executable instructions, software, firmware, or combinations thereof. Computer-executable instruction, software, or firmware implementations of the processor 216 may include computer-executable or machine-executable instructions written in any suitable programming language to perform the various functions described. The memory 214 may include more than one memory and may be distributed throughout the grasp management service 102. The memory 214 may store program instructions that are loadable and executable on the processor(s) 216, as well as data generated during the execution of these programs. Depending on the configuration and type of memory including the grasp management service 102, the memory 214 may be volatile (such as random access memory (RAM)) and/or non-volatile (such as read-only memory (ROM), flash memory, or other memory). The memory 214 may include an operating system 218 and one or more application programs, modules, or services for implementing the features disclosed herein including at least a grasp management engine 220 and a grasp execution engine 222. As described in detail herein, the grasp management engine 220 may be configured to generate and validate grasp sets. The grasp execution engine 222 may be configured to instruct one or more robotic manipulators to execute a set of grasps that have been generated and validated as described herein. In some examples, the management device 212 includes the same or similar functionality as the grasp management service 102. For example, the management device 212 may include an engine comparable to the grasp management engine 220 and an engine comparable to the grasp execution engine 222.

The grasp management service 102 may also include additional storage 224, which may be removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. The additional storage 224, both removable and non-removable, are examples of computer-readable storage media, which may be non-transitory. For example, computer-readable storage media may include volatile or non-volatile, removable or non-removable media implemented in any suitable method or technology for storage of information such as computer-readable instructions, data structures, program modules, or other data. As used herein, modules, engines, and components, may refer to programming modules executed by computing systems (e.g., processors) that are part of the grasp management service 102.

The grasp management service 102 may also include input/output (I/O) device(s) and/or ports 226, such as for enabling connection with a keyboard, a mouse, a pen, a voice input device, a touch input device, a display, speakers, a printer, or other I/O device.

The grasp management service 102 may also include a user interface 228. The user interface 228 may be utilized by an operator or other authorized user to access portions of the grasp management service 102. In some examples, the user interface 228 may include a graphical user interface, web-based applications, programmatic interfaces such as application programming interfaces (APIs), or other user interface configurations. The grasp management service 102 may also include a data store 230. In some examples, the data store 230 may include one or more data stores, databases, data structures, or the like for storing and/or retaining information associated with the grasp management service 102. For example, the data store 230 may include databases, such as an item database 232, an arm tool database 234, and a grasp database 236.

The item database 232 may be configured to retain information such as the item information 104 and other suitable information that identifies items. The information in the item database 232 may be organized in any suitable manner to enable access by components of the grasp management service 102 such as the grasp management engine 220. The item database 232 may include an entry for each inventory item that the grasp management service 102 may encounter. As a result, this may include entries on a scale of hundreds of thousands or even millions. For each entry that corresponds to an item, the item database 232 may include an item identifier (e.g., a unique product identifier), a description of the item, one or more stock images of the item, a surface model of the item or a link to the surface model of the item, a primitive shape model of the item or a link to the primitive shape model, a bounding box representation of the item, one or more actual images of the item (e.g., taken as it entered a facility), dimensions of the item (e.g., height, width, length), a location of a center of mass, a total weight, and any other suitable of information related to the item. This information can be used as part of determining a set of grasps for picking up the item and validating those grasps.

The arm tool database 234 may be configured to retain the information such as the arm tool information 106 and any other suitable information associated with the arm tools described herein. In some examples, information stored in the arm tool database 234 may be organized according to different categories of arm tools and may include specification information for each arm tool. This may include capacities of the arm tools in terms of amount of force, pressure, voltage, current, and geometric constraints, contact point constraints, and any other constraint. Any suitable end of arm tool including any suitable grasping function may be included in the arm tool database 234 and may be utilized in accordance with techniques described herein. A grasping function may define functionally how an end of arm tool is capable of manipulating an item. The grasping function may differ between end of arm tools with respect to capacities, categories, and physical limitations. Example categories of end of arm tools include: soft robotic arm tools, vacuum arm tools, electro-adhesion arm tools, and mechanical or electromechanical arm tools. Soft robotic arm tools may generally include flexible structures that may be manipulated between various orientations. The structures may include silicon bodies or other flexible material. Manipulation of the flexible material may be achieved through use of flexible actuators such as air muscles (e.g., contractile or extensional devices operated by pressurized air movement relative to filling or emptying a pneumatic bladder), electro-active polymers (e.g., polymers which change size or shape when stimulated by an electric field), or ferrofluids (e.g., fluids having suspended ferro-magnetic particles capable of altering a size or shape of the fluid volume when subjected to a magnetic field). Vacuum arm tools may grasp items using suction. Electro-adhesion arm tools can include an array of electrodes arranged along a flexible or rigid substrate capable of applying a charge (akin to static electricity) that can adhere an item to the substrate portions that are in contact with the item. Mechanical or electromechanical arm tools may include pinchers, claws, grippers, or other rigid components that may be actuated relative to one another for grasping an item. Other arm tools may also be utilized to facilitate additional grasping functions.

The grasp database 236 may be configured to retain information such as the grasp information 108 and the grasps 112. In this manner, the grasp database 236 may be an example of the grasp database 114 described herein. The grasp database 236 may be configured to retain information about grasps that have been generated, taught, validated, attempted, or otherwise managed as described herein. For each grasp, the grasp database 236 may retain an arm tool used for the grasp, an item or feature of an item associated with the grasp, one or more grasping surfaces on the item or feature of the item, contact points within the grasping surfaces where the arm tool may contact the item when executing the grasp, primitive shapes corresponding to features of the item, success rates for this particular grasp, an orientation of the item associated with this particular grasp, an orientation of an end of arm tool with respect to the item associated with this particular grasp, and/or any other suitable information pertaining to a grasp. In some examples, the grasps stored in the grasp database 236 may be determined at one or more testing locations (e.g., an environment where an actual robotic manipulator may iteratively attempt to grasp an item or a simulated environment where similar attempts can be made in simulation or calculated analytically). Once a suitable number of grasps have been determined and, in some examples, validated, the grasp database 236 may be made accessible for other robotic manipulators operating under actual conditions. This may be done by making the grasp database 236 accessible via a cloud-based server, networked server, or in any other suitable manner. For example, robotic manipulators that handle inventory in one or more warehouses located throughout a geographic region can access the grasp database 236 simultaneously or copies of the grasp database 236 to search for appropriate grasps based on the conditions they encounter. Using techniques described herein, the success and failure of the grasps from the grasp database 236 under actual conditions may be used to update the grasps from the grasp database 236. This may include eliminating certain grasps from consideration, adjusting probabilities of success for certain grasps, adding new grasps learned under actual conditions, and any other suitable updates. Storage of the grasp information described herein in the grasp database 236 may improve the functioning of the grasp management service 102 by enabling quicker and more efficient searching of feasible grasps.

Figure 3:
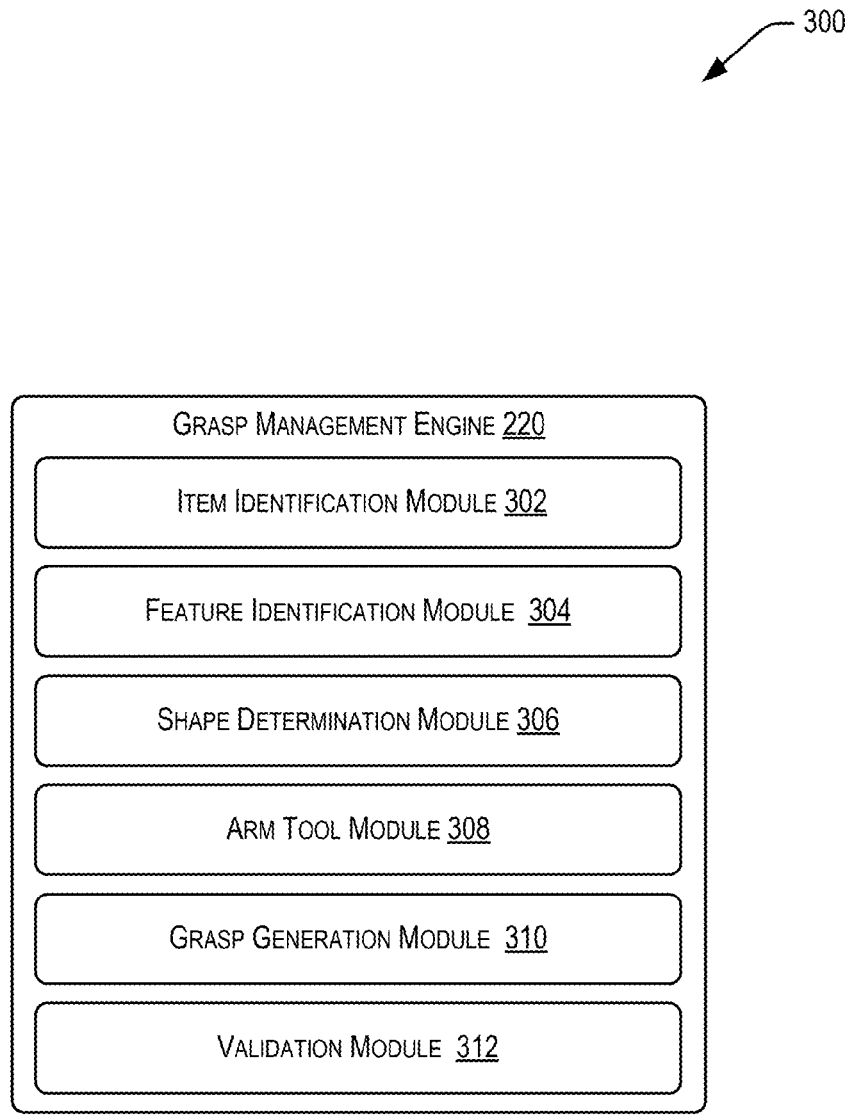
FIG. 3 is an example device for implementing techniques relating to generating and validating grasp sets for robotic manipulators as described herein, according to at least one example.

FIG. 3 illustrates an example device 300 including the grasp management engine 220. The grasp management engine 220 may be configured to manage one or more sub-modules, components, and/or services directed to examples disclosed herein. In some examples, the grasp management engine 220 may include an item identification module 302, a feature identification module 304, a shape determination module 306, an arm tool module 308, a grasp generation module 310, and a validation module 312. While these modules are illustrated in FIG. 3 and will be described as performing discrete tasks with reference to the flow charts, it is understood that FIG. 3 illustrates example configurations and other configurations performing other tasks and/or similar tasks as those described herein may be implemented according to the techniques described herein.

The item identification module 302 may be configured to access information about items in the item database 232. This can include, for example, general characteristics of the items and aspects of the items that are determined using the techniques described herein. For example, the item identification module 302 may be configured to access information about a set of grasping surfaces on item. In some examples, the item identification module 302 receives sensing information captured by a robotic arm and identifies an item based on the sensing information. For example, a sensor may scan a barcode on the item and barcode information may be used by the item identification module 302 to identify the item.

The feature identification module 304 may be configured to identify features of items identified by the item identification module 302. This can include, for example, analyzing a model of an item and a set of grasping surfaces corresponding to a feature of the item to identify other features of the item. In some examples, the feature identification module 304 may be capable of processing a surface model of an item to identify features that can be used for grasping the item.

The shape determination module 306 may be configured to determine one or more primitive shapes based on one or more grasping surfaces. For example, after a robotic manipulator has been taught to pick up an item by a feature of the item (e.g., a handle of a coffee mug), the shape determination module 306 may function to generate a primitive shape that corresponds to the handle. The primitive shape may be selected from a set of primitive shapes to closely correspond to the part. The set of primitive shapes may include shapes such as cuboids, cylinders, pyramids, spheres, cones, toroids, and any other suitable primitive shapes. If a single primitive shape cannot be found that corresponds closely to the handle (e.g., by comparing the volume of the handle with the volume of the primitive shape), a second primitive shape may be selected and combined with the first. The second primitive shape may be of the same type as the first or different. Use of more than one primitive shape may, in some examples, result in a better approximation of the shape volume of the handle. In some examples, a primitive shape may be selected that simply approximates two parallel surfaces (e.g., where opposing fingers of a two-finger grabber contact an item). The shape determination module 306 may be configured to calculate fill volumes. In some examples, primitive shapes generated by the shape determination module 306 may be stored together with their associated grasps in the grasp database 236, together with the arm tools in the arm tool database 234 which can pick up an item having the primitive shapes, and/or together with the items in the item database 232 from which the primitive shapes were derived.

The arm tool module 308 may be configured to access information about end of arm tools as used herein. To this end, the arm tool module 308 may be configured to access the arm tool database 234. The arm tool module 308 may also be configured to access information identifying a particular arm tool that is being used to manipulate an item.

The grasp generation module 310 may be configured to generate grasps for end of arm tools to grasp items. The grasp generation module 310 may access any suitable information in order to generate the grasps. In some examples, the grasp generation module 310 may be used to generate grasps in response to input from a human operator. For example, the human operator may use the grasp generation module 310 to teach a robotic arm how to manipulate an end of arm tool to pick up an item. The grasp generation module 310 may then save the characteristics of the taught grasp in the grasp database 236 or in some other location. The grasp generation module 310 may access the taught grasp and other successful grasps in order to generate other potential grasps for grasping the same item or other similar items using the same end of arm tool or other end of arm tools, as described herein.

The validation module 312 may be configured to evaluate and validate a set of grasps using a simulation environment or an actual environment. In some examples, the validation module 312 may include functionality to cause a robotic manipulator to autonomously and iteratively evaluate a set of grasps on an item. This may include varying the orientation of the item with respect to the robotic manipulator (e.g., rotating the item to expose different features and/or surfaces), varying the orientation of an end of arm tool with respect to the item, attempting each grasp one or more times, recording successes rates for each grasp based on attempted grasps, and any other suitable aspect related to evaluating and validating a set of grasps. In some examples, the validation module 312 may function to expand the set of validated grasps to form an expanded set of grasps. This may be achieved, in part, by the validation module 312 evaluating successful grasps from the set to identify predictably successful grasps. These predictably successful grasps may be grasps that the validation module 312 has predicted would likely be successful. The validation module 312 may evaluate the set of predictably successful grasps for feasibility by causing the robotic manipulator to execute the set of predictably successful grasps. This may include executing each of the predictably successful grasps multiple times and recording success rates. These success rates may be used to determine a probability of success for each predictably successful grasps, that may result in the expanded set of feasible grasps.

The validation module 312 may also be configured to determine a richness measure based on its evaluation and validation of sets of grasps. The richness measure may represent a spatial variation of grasps within a particular grasp set. This may include a spatial variation with respect to a particular item, a particular orientation of the item with respect to the robotic manipulator, a particular grasping orientation of an end of arm tool with respect to the item, a particular arm tool, and any other suitable factor. In some examples, the richness measure normalizes differences between grasps in a given grasp set to a surface area of the item. In this manner, the richness measure may be independent of the size of the item. Richness measures for items, irrespective of size, may be compared. The richness measure may be used to determine when a given grasp set is sufficiently complete. For example, when a grasp set has a high richness measure (e.g., that meets or exceeds a threshold), the grasp set may be considered "complete." In this example, the grasp set may be stored and used in the future to grasp the given item. If, for example, the richness measure for a grasp set for an item or a grasp set for an orientation of an item fails to meet a threshold (e.g., has a low value), the grasp set may be evaluated using techniques described herein in order to expand the grasp set. This may include identifying predictably successful grasps that can be evaluated on hardware (e.g., the robotic manipulator, actual item, and/or end of arm tool) to determine whether the actual grasps will be successful under actual conditions.

Figure 4:
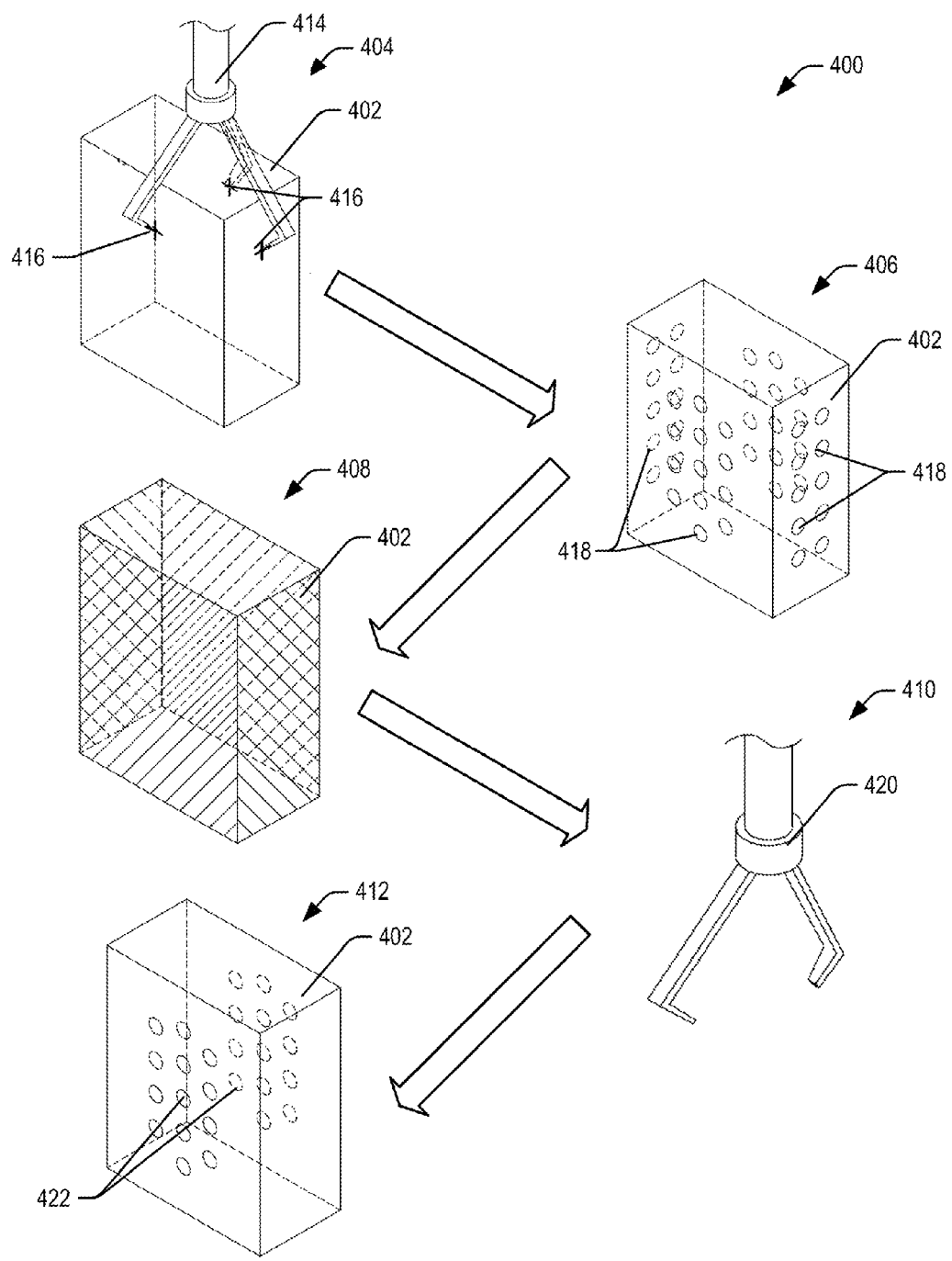
FIG. 4 is a diagram depicting techniques relating to generating grasp sets for robotic manipulators as described herein, according to at least one example.

FIG. 4 illustrates a diagram 400 that depicts an item 402 and objects related to the item 402 at various states 404-412. The diagram 400 may illustrate a process by which a single grasp using a first end of arm tool and including a set of contact points is used to generate multiple grasps including multiple sets of contact points for the same end of arm tool. The diagram may also illustrate a process by which a single grasp or a set of grasps for a first end of arm tool is used to generate a set of grasps for a second end of arm tool.

The item 402 may be an example of an item that may be present in an inventory system or any other situation or environment where a robotic manipulator may be present. While the item 402 is illustrated as having a rectangular shape, it is understood that the techniques described herein are equally applicable to an item having any other shape, including non-uniform shapes.

Beginning at the state 404, a first end of arm tool 414 is shown engaging with the item 402 at a plurality of initial contact points 416. The first end of arm tool 414 is an example of a three-finger grabber end of arm tool. Thus, each finger of the first end of arm tool 414 contacts the item 402 at three different initial contact points 416. In some examples, a human operator may have instructed a robotic manipulator connected to the first end of arm tool 414 to pick up the item 402 as illustrated at the state 404. The actions taken by the first end of arm tool 414 (e.g., movements, open and close, etc.) and the locations on the item 402 corresponding to the initial contact points 416 may be saved and used for later analysis. This saved information together may form a taught grasp for the first end of arm tool 414 to pick up the item 402. In some examples, the taught grasp may be validated by attempting to simulate the taught grasp in a simulation environment or calculating the taught grasp analytically. If the taught grasp can be successfully simulated, the information about the state 404 may be saved and used to generate other grasps.

At the state 406, the initial contact points 416 have been extrapolated to create a set of extrapolated contact points 418. Sets of the extrapolated contact points 418 may correspond to the geometry of the first end of arm tool 414. For example, while the initial contact points 416 are in the middle of the item 402, the extrapolated set of contact points 418 may extend above, below, and to the sides of the initial contact points 416. Thus, the extrapolated contact points 418 are located on all four vertical sides of the item 402 in the state 406, not just on the three vertical sides like in the state 406. In some examples, the set of extrapolated contact points 418 may overlap with each other.

At the state 408, surfaces of the item 402 where the initial contact points 416 and the set of extrapolated contact points 418 are located are saved as grasping surfaces. Thus, at the state 408, the four vertical sides of the item 402 are identified as grasping surfaces. In some examples, the particular grasp may be associated with a subset of the grasping surfaces. For example, given that the first end of arm tool 414 is capable of grasping only three sides, in this example, each grasp may include no more than three grasping surfaces.

At the state 410, a second end of arm tool 420 is identified. The second end of arm tool 420 is an example of a two-finger grabber end of arm tool. The set of extrapolated contact points 418 and the grasping surfaces in the state 408 may be used to generate a set of grasps for the second end of arm tool 420 to pick up the item 402. In some examples, the second end of arm tool 420 may have a grasping function that is related the grasping function of the first end of arm tool 414.

At the state 412, a second set of contact points 422 is generated. The second set of contact points 422 may be generated based at least in part on the set of extrapolated contact points 418, the grasping surfaces in the state 408, and/or the geometry of the second end of arm tool 420. In some examples, the second set of contact points 422 may correspond to a second set of grasps for the second end of arm tool 420 to pick up the item 402. In some examples, instead of or in addition to generating the second set of contact points 422, the grasping surfaces from the state 408 are accessed and searched for feasible grasps using the second end of arm tool 420. If the second end of arm tool 420 is not kinematically capable of reaching each of the grasping surfaces, a fewer number of surfaces may be used.

Figure 5:
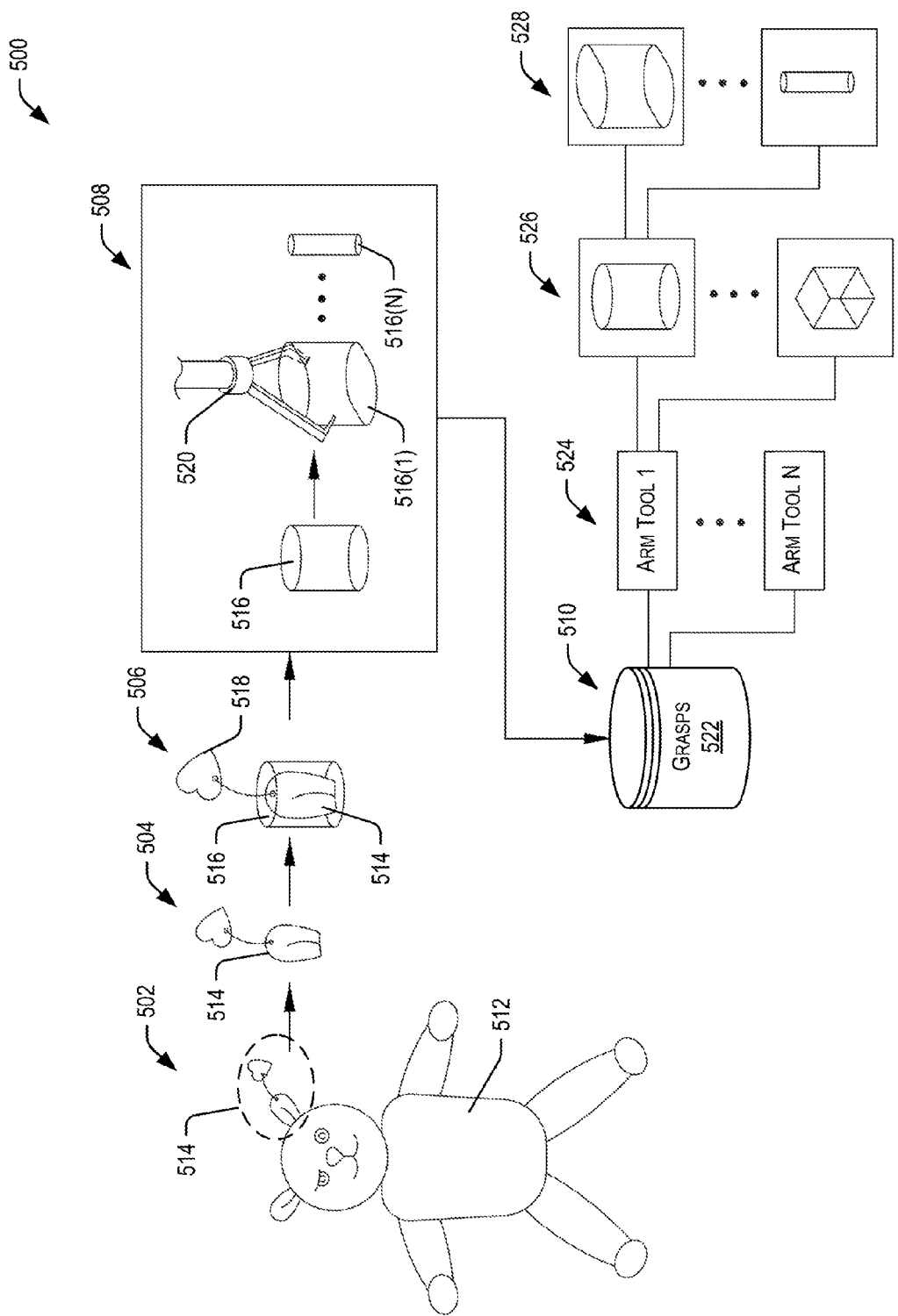
FIG. 5 is a diagram depicting techniques relating to generating grasp sets for robotic manipulators as described herein, according to at least one example.

FIG. 5 illustrates a diagram 500 that depicts different states 502-510 of a process for generating a set of grasps based on an item 512. The item 512 in this example is a teddy bear. The item 512 may include a feature 514. In this example, the feature 514 is an ear of the teddy bear. Prior to the state 502, there may not be any known successful way of picking up the item 512 using an end of arm tool of a robotic manipulator. In some examples, a human operator may instruct the robotic manipulator to cause the end of arm tool to pick up the item 512 by the feature 514. In some examples, the robotic manipulator may randomly pick up the item 512 by the feature 514 without input from the human operator.

In any event, grasp information identifying characteristics of how the feature 514 was grasped may be saved. This information may include a set of contact points on the feature 514 where the end of arm tool contacted the feature 514. These contact points may correspond to one or more grasping surfaces. For example, if the end of arm tool grasped the feature 514 with a two-finger grabber there may be two grasping surfaces disposed opposite each other. At the state 504, the grasping surfaces may correspond to the shape of the feature 514. At the state 506, the grasping surfaces, which correspond to the shape of the feature 514, may be bounded by a primitive shape 516. The primitive shape may be selected from a set of primitive shapes and in a manner that attempts to most closely approximate the grasping surfaces, which, in this example, correspond to the shape of the feature 514. In some examples, parts of the feature 514, which do not correspond to grasping surfaces may be ignored and/or not included in the primitive shape 516. For example, tag 518 is illustrated in the state 506 as being located outside of the primitive shape 516 and is therefore ignored. The primitive shape 516 may function as a bounding shape that includes the grasping surfaces.

In some examples, the fill of the primitive shape 516 may be evaluated. This may include calculating a fill volume for the primitive shape 516 that compares a total volume of the feature 514 (or the grasping surfaces) compared to the total volume of the primitive shape 516. In some examples, this comparison may yield a metric that can be used to determine whether the fill volume is appropriate. If the fill volume is too low, it may be difficult to extrapolate the grasp information learned with respect to the feature 514 to other similar features on the item 512 or on other items. Thus, the fill volume may be compared to a predetermined threshold value to determine whether it is too low. If the fill volume is too low, in some examples, a second primitive shape may be selected and combined with the primitive shape 516 to approximate the feature 514. If more than one primitive shape is used to approximate the feature 514, the spatial relationship between the two primitive shapes may be saved. In some examples, more than two primitive shapes may be used to approximate a feature.

At the state 508, the size of the primitive shape 516 is expanded and contracted to create different versions 516(1)-516(N) of the primitive shape 516. These different versions may be considered altered primitive shapes. Dimensions of the expansions and contractions may correspond to the physical limits of a particular end of arm tool 520. The expanded and contracted dimensions may correspond to the locations where the particular end of arm tool 520 touched the feature 514 and/or the primitive shape 516. For example, at the state 508, the diameters of the cylindrical primitive shapes 516(1)-516(N) are expanded and contracted because the particular end of arm tool 520 contacted the primitive shape 516 on the outside surfaces of the feature 514 (e.g., on the circular portion of the primitive shape 516). In some examples, the particular end of arm tool 520 is the end of arm tool used to pick up the item 512 by the feature 514. In other examples, the particular end of arm tool is a larger or smaller version of the end of arm tool used to pick up the item 512 by the feature 514. In this manner, the grasp information learned by picking up the first item 512 by the feature 514 may be used to identify a range of primitive shapes, represented by the versions 516(1)-516(N) of the primitive shapes 516, that can be compared to features of other items having similar primitive shape representations. In some examples, the physical limits of end of arm tools may be determined analytically by comparing the physical characteristics of end of arm tools (e.g., end of arm tool information) with the primitive shape 516.

At the state 510, a grasp database 522 may be populated using the information generated at the earlier states 502-508. The grasp database 522 is an example of the grasp database 236. In some examples, the grasp database 522 may include a set of end of arm tools 524. In some examples, the particular end of arm tool 520 may be included as one of the end of arm tools in the set of end of arm tools 524. Each end of arm tool 524 may be associated with a set of primitive shapes 526. For each end of arm tool in the set of end of arm tools 524, a particular set of primitive shapes 526 may be generated in accordance with the techniques described herein. In some examples, the set of primitive shapes 526 may be generated as described with reference to states 502-506. Thus, the set of primitive shapes 526 may include a cylinder, a cuboid, and any other suitable variety of primitive shapes. The set of primitive shapes 526 may each be graspable by the end of "arm tool 1" in the set of end of arm tools 524. Further, the grasp database 522 may include, for each primitive shape in the set of primitive shapes 526, differently sized versions 528 of the respective primitive shape. Thus, for the cylinder in the set of primitive shapes 526, a larger and smaller version are illustrated in a set of differently sized versions 528 as described with reference to state 508.

When a new item is encountered and it is desired to pick up the item using "arm tool 1" of the set of end of arm tools 524, the grasp database 522 may be used to identify features of the new item that have primitive shapes that are similar to any of the set of primitive shapes 526 and sized similar to the versions 528. In this manner, even without having previously attempted to grasp the new item, a grasp associated with the appropriately sized version of a primitive shape may be identified from the grasp database 522 and used to grasp a feature of the new item.

Figure 6:
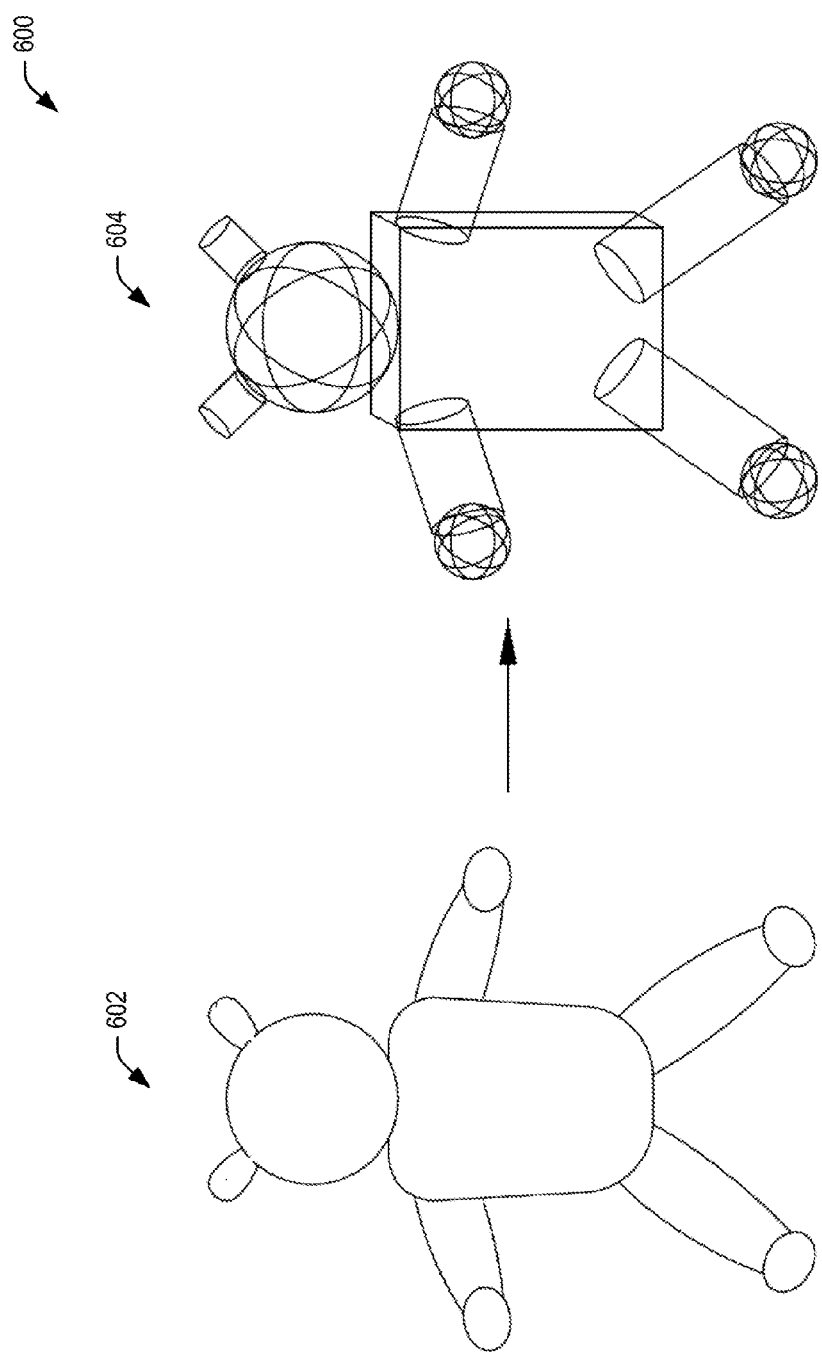
FIG. 6 is a diagram depicting a representation of an item for use in implementing techniques relating to generating grasp sets for robotic manipulators as described herein, according to at least one example.

FIG. 6 illustrates a diagram 600 that depicts a model 602 of an item and a primitive model 604 of the item. The model 602 may be a surface model and may be associated with the item (e.g., in an item database). The model 602 may represent an exterior surface of the item. In some examples, the model 602 may be generated for each new item that is added to an inventory system and maintained by the grasp management service 102. In other examples, a manufacturer or third-party entity may generate the model 602 as part of having inventory in the inventory system. In some examples, the grasp management engine 220 may function to generate the model 602 and/or the primitive model 604. For example, the model 602 may be based on one or more three-dimensional scans of the item. In some examples, the one or more scans may be used to identify features of the item that are flexible and rigid. For example, the one or more scans may be captured from different perspectives and compared to identify features that moved between scans and those that did not move. In some examples, the one or more scans may be three-dimensional and may be captured by an imaging device such as a camera or video camera. The orientation of the first item may be varied with respect to the imaging device in each three-dimensional scan in the set of three-dimensional scans. A flexible feature of the item may be identified based at least in part on the flexible feature being located in at a first position with respect a portion of the first item in a first three-dimensional scan and in a second position with respect to the portion of the item in a second three-dimensional scan. Once the flexible feature has been identified, a record of the item may be updated and the flexible feature may be used to identify other flexible features on other items, as described herein. In some examples, a rigid feature may be connected to the item via one or more flexible features. Like identifying the flexible feature, one or more scans may be used to identify the rigid feature. This may be performed by accessing a set of three-dimensional scans of the item captured by the imaging device. The orientation of the second item may be varied with respect to the imaging device in each three-dimensional scan in the set of three-dimensional scans. The rigid feature may be identified as such based at least in part on a first portion of the rigid feature being located at a same relative position with respect to another portion of the rigid feature in each of the three-dimensional scans of the set of three dimensional scans and the rigid feature being located at a first position with respect to the item in a first three-dimensional scan and in a second position with respect to the item in a second three-dimensional scan.

The primitive model 604 may be generated based at least in part on the model 602. The primitive model 604 may include one or more primitive shapes representative of the model 602 and the item. Thus, as illustrated, the primitive model 604 may include a combination of a cuboid as a torso, four cylinders as arms and legs, four spheres as hands and feet, a sphere as a head, and two cylinders as ears. Using the primitive model 604 and information from a grasp database that includes grasps based on similar primitive shapes, a set of predictably successful grasps may be generated for picking up the item at any of the locations represented by primitive shapes (e.g., ears, head, torso, arms and legs, or hands and feet). These predictably successful grasps may be shared with a robotic manipulator for validation and execution.

Figure 7:
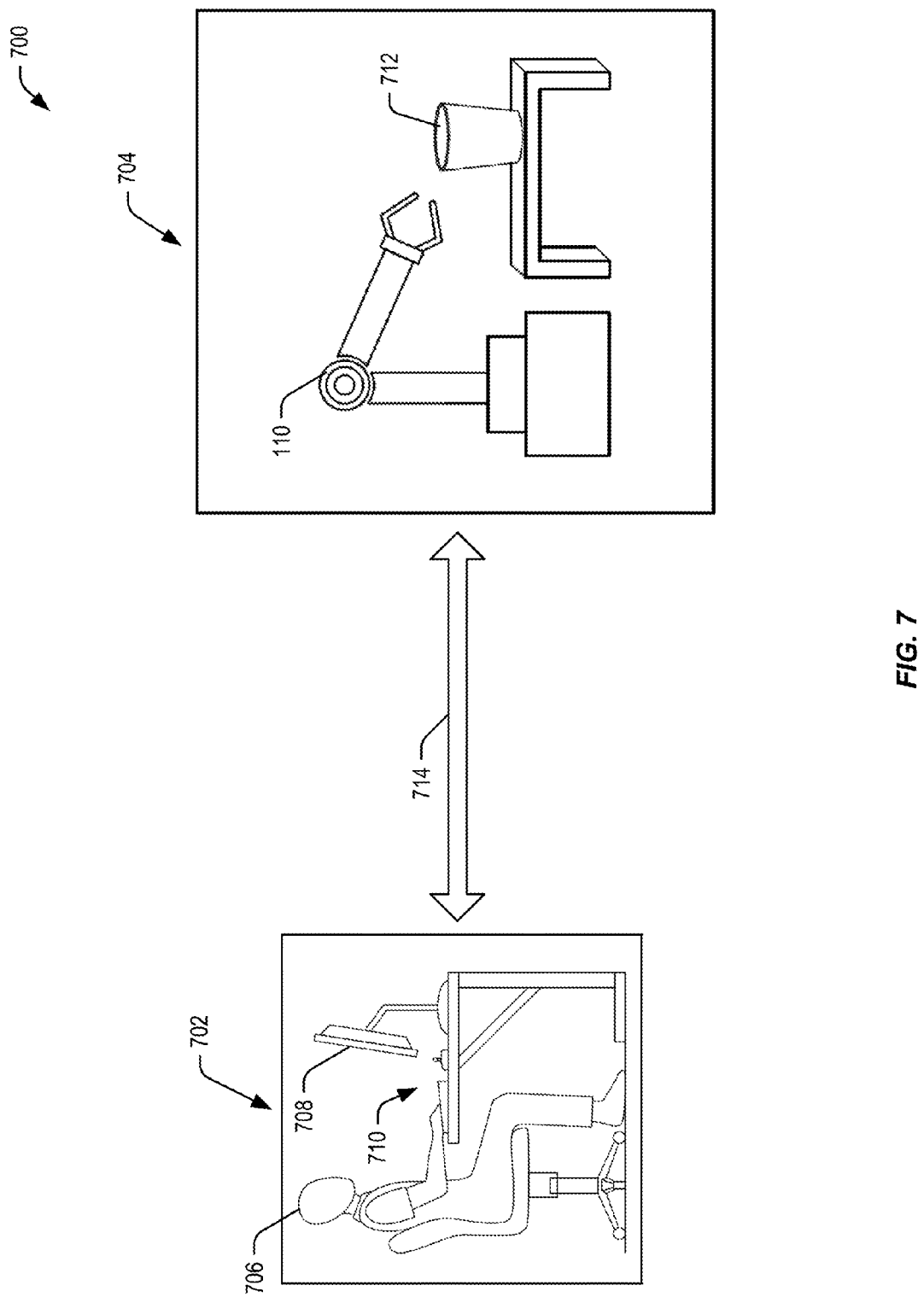
FIG. 7 is a diagram depicting an example environment for implementing techniques relating to generating grasp sets for robotic manipulators as described herein, according to at least one example.

FIG. 7 illustrates an environment 700 including an operator station 702 and a grasping station 704. Generally, the operator station 702 may be in communication via a communication network 714 with the grasping station 704 such that an operator 706 of the operator station 702, who may be remote from the grasping station 704, may control aspects of the robotic manipulator 110. The operator 706 is an example of the user 210 and the operator station 702 may include the user device 204. In some examples, this may be possible via a graphical user interface that enables the operator 706 to view and control in real-time the robotic manipulator 110. The grasp management service 102 may be capable of providing such an interface. Using the interface, the operator 706 may view on an output device 708 (e.g., a display device) aspects of the grasping station 704. For example, the output device 708 may display a streaming video feed of the grasping station 704. Such streaming may enable the operator 706 to use input devices 710 (e.g., keyboard, joystick, touchscreen display on the output device 708, etc.) to tele-operate the robotic manipulator 110 and identify items. In some examples, the graphical user interface enables a display of a generated representation of the grasping station 704. For example, using the graphical user interface, the operator 706 may select, from a three-dimensional model representative of an item 712, one or more graspable surfaces on the item 712 (e.g., an outside surface and an inside surface). Using these graspable surfaces, a grasp may be generated. In some examples, the operator 706 may select the graspable surfaces and a possible grasp from a list of grasps. The robotic manipulator 110 may then attempt to grasp the item 712 using the selected grasping surfaces and grasp. In some examples, the operator 706 may directly instruct the robotic manipulator 110 how to pick up the item 712 by controlling the movements of the robotic manipulator 110. Both examples may be considered teaching acts, and the information associated with the attempted grasps can be saved and used to generate other grasps, as described herein.

In some examples, the grasping station 704 may operate without communicating with the operator station 702. For example, the robotic manipulator 110 may function autonomously or semi-autonomously to test a set of predictably successful grasps to determine whether the set is feasible. This may include the robotic manipulator 110 iteratively attempting to pick up the item 712. The robotic manipulator 110 may change its grasping orientation with respect to the item 712 and again iteratively attempt to pick up the item 712. The robotic manipulator may change the orientation of the item 712 and iteratively attempt to pick up the item 712. The success rates for each iteration may be recorded and used to improve the set of predictably successful grasps. In some examples, if the robotic manipulator 110 is unable to find any suitable feasible grasps, a notification may be generated. The generated notification may be provided to the operator 706 via any suitable device (e.g., the user device 204). The operator 706 may then connect to the robotic manipulator 110 and teach it how to pick up the item 712.

Figure 8:
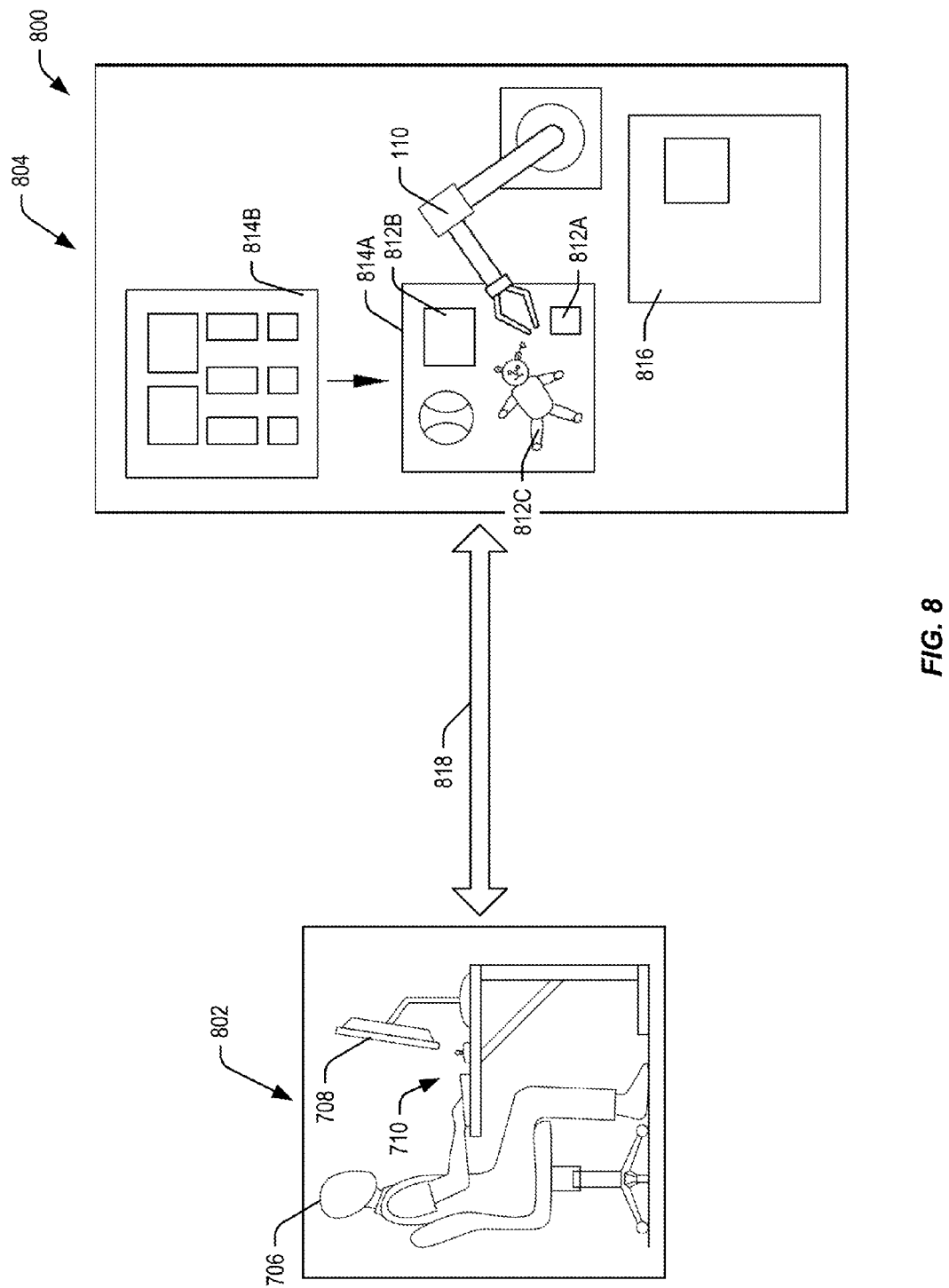
FIG. 8 is a diagram depicting an example environment for implementing techniques relating to generating grasp sets for robotic manipulators as described herein, according to at least one example.

FIG. 8 illustrates an environment 800 including an operator station 802 and a grasping station 804. The operator station 802 is an example of the operator station 702 and therefore also may include an operator 706, an output device 708, and input devices 710. Generally, the operator station 802 may be in communication via a communication network 818 with the grasping station 804 such that the operator 706 of the operator station 802, who may be remote from the grasping station 804, may control aspects of the robotic manipulator 110. As described with reference to FIG. 7, this may be achieved via a graphical user interface. The grasping station 804 may be a live grasping station. In other words, the robotic manipulator 110 may be operating to pick, move and place items 812 between bins 814 and a pallet 816, for example, under actual operating conditions. For example, the bins 814 may be full of inventory items and the robotic manipulator 110 may be using its sensors to identify certain ones of the inventory items to pick up out of the bins 814 as the bins 814 are moved into place before the robotic manipulator 110. If the robotic manipulator 110 is unable to determine a feasible grasp for picking up one of the items (e.g., item 812C), the operator 706 may be notified and connect to the robotic manipulator 110 and cause the robotic manipulator to grasp the item 812C, move other items 812A and 812B using the robotic manipulator 110 that may be occluding the vision of the robotic manipulator 110, and perform any other suitable technique to increase the probability of a successful grasp. In some examples, the operator 706 may function to assist the robotic manipulator 110 with item identification. For example, the robotic manipulator 110 may not be able to identify a required item from the bin 814A. In response, a list of items corresponding to those in the bin 814A together with images of the items may be presented on the output device 708 at the operator station 802. In addition, an image of the bin 814A, perhaps from the perspective of the robotic manipulator 110, may be presented on the output device 708. Based on this information, the operator 706 may identify the required item and cause the robotic manipulator to pick up the required item.

FIGS. 9-12 illustrate example flow diagrams showing respective processes 900, 1000, 1100, and 1200 as described herein. These processes 900, 1000, 1100, and 1200 are illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement the processes.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium is non-transitory.

Figure 9:
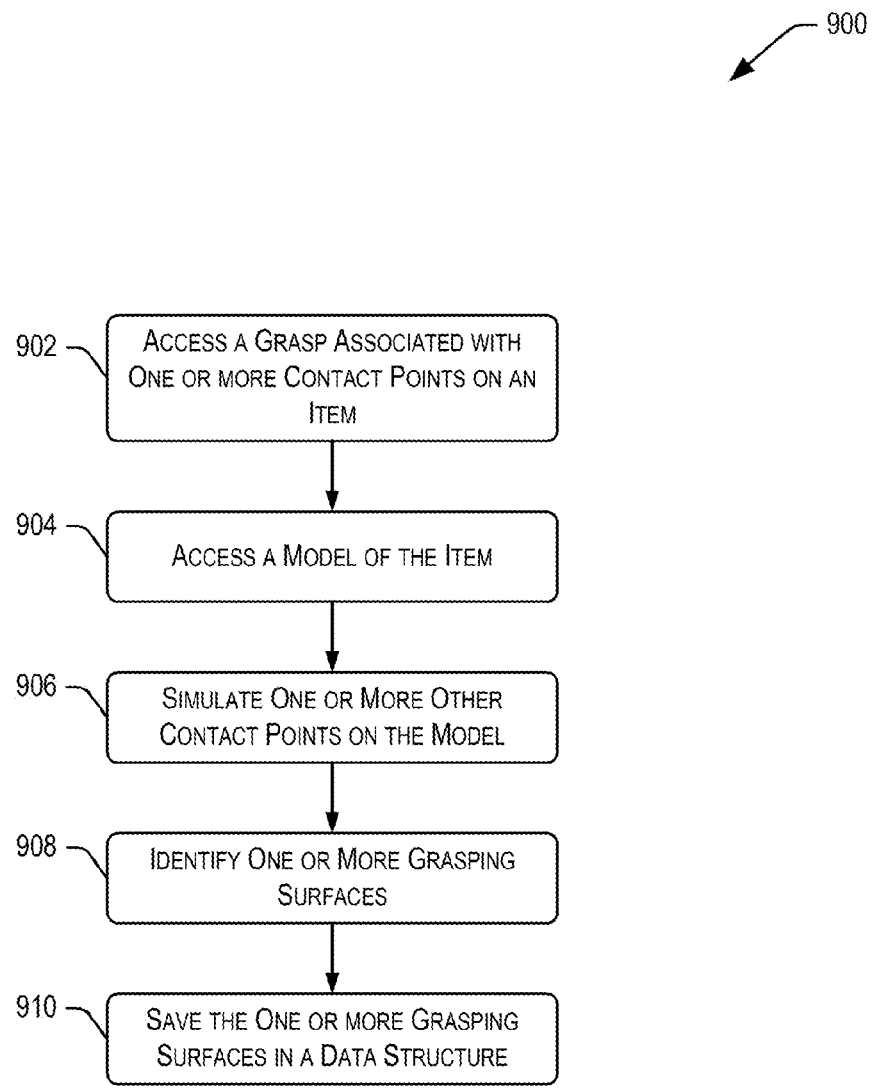
FIG. 9 is a flow diagram depicting example acts for implementing techniques relating to generating grasp sets for robotic manipulators as described herein, according to at least one example.

FIG. 9 depicts the process 900 including example acts or techniques relating to generating grasps for a robotic manipulator to pick up an item as described herein. The grasp management engine 220 (FIG. 2) may perform the process 900 of FIG. 9. The process 900 begins at 902 by accessing a grasp associated with one or more contact points on an item. This may be performed by the item identification module 302 (FIG. 3). In some examples, the grasp may have been previously successfully executed by an end of arm tool to grasp the item at the one or more contact points. The grasp may have been determined based at least in part on input from a human operating a robotic manipulator utilizing a grasping function of the end of arm tool to grasp the item at the one or more contact points.

At 904, the process 900 may access a model of the item. This may be performed by the item identification module 302. The model may be associated with the item in an item database and may be a three-dimensional representation of the item. In some examples, the model is a surface model.

At 906, the process 900 simulates one or more other contact points on the model. This may be performed by the grasp generation module 310 (FIG. 3). Simulating the one or more other contact points on the model may include extrapolating the one or more contact points on the model. In some examples, the one or more other contact points may represent other locations where the end of arm tool may likely be able to grasp the item. The one or more other contact points may be adjacently located to the one or more contact points. In some examples, the one or more other contact points are simulated in a manner that is considerate of the geometric restraints of the end of arm tool.

At 908, the process 900 identifies one or more grasping surfaces. This may be performed by the grasp generation module 310. The one or more grasping surfaces may be exterior surfaces on the item that have at least one contact point and have a mostly planar shape. In this manner, the surfaces may be good locations where an end of arm tool can contact the item in order to pick up the item. In some examples, the one or more other contact points may be arranged to define the one or more grasping surfaces. Thus, the one or more grasping surfaces may be identified based at least in part on the one or more other contact points.

At 910, the process 900 saves the one or more grasping surfaces in a data structure. In some examples, this may be performed by the grasp generation module 310. Saving the one or more grasping surfaces may include saving the grasping surfaces in a grasp database. The one or more grasping surfaces may be associated with the item and used when a second end of arm tool is required to pick up the item and in other circumstances. For example, information about the second end of arm tool may be accessed and a new set of grasps for the second end of arm tool may be generated based at least in part on the one or more grasping surfaces.

Figure 10:
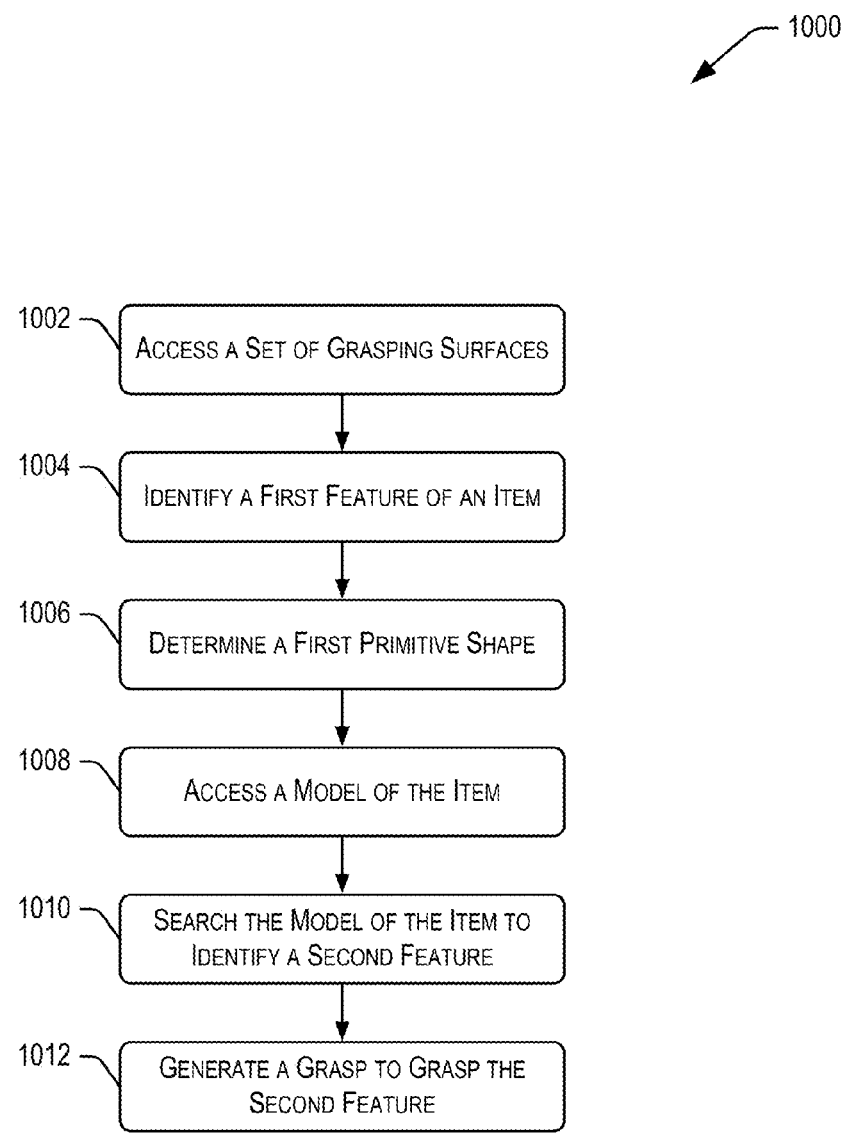
FIG. 10 is a flow diagram depicting example acts for implementing techniques relating to generating grasp sets for robotic manipulators as described herein, according to at least one example.

FIG. 10 depicts the process 1000 including example acts or techniques relating to generating a grasp based on a feature of an item as described herein. The grasp management engine 220 (FIG. 2) may perform the process 1000 of FIG. 10. The process 1000 begins at 1002 by accessing a set of grasping surfaces. This may be performed by the grasp generation module 310 (FIG. 3). Accessing the set of grasping surfaces may include accessing from a database such as a grasp database. In some examples, the set of grasping surfaces may have been previously determined in accordance with process 900 or some other suitable process. The set of grasping surfaces may be representative of a set of contact points on a first item where an end of arm tool can grasp a feature of the first item.

At 1004, the process 1000 identifies a first feature of an item. This may be performed by the feature identification module 304 (FIG. 3). In some examples, identifying the first feature of the item may include determining the first feature based at least in part on the set of grasping surfaces. For example, the grasping surfaces may correspond spatially to the first feature.

At 1006, the process 1000 determines a first primitive shape. This may be performed by the shape determination module 306 (FIG. 3). Determining the first primitive shape may be based at least in part on the set of grasping surfaces. The first primitive shape may also correspond to the first feature. In some examples, determining the first primitive shape may include determining more than one primitive shape that together can approximate the first feature and include the grasping surfaces. Thus, the first primitive shape may correspond to the set of surfaces.

At 1008, the process 1000 accesses a model of the item. This may be performed by the item identification module 302 (FIG. 3). The model may be representative of the item including the feature. For example, the model may be a three-dimensional rendering of the item accessible in an item database.

At 1010, the process 1000 searches the model of the item to identify a second feature. This may be performed by the feature identification module 304. Searching the model may include comparing the feature to the model to identify similar features. For example, the second feature may have a similar shape as the first feature, but have larger dimensions. In some examples, searching the model of the item may include searching a model of a second item for features that are similar to the first feature. Identification of the similar features may enable grasps to be determined for the similar features of the second item.

At 1012, the process 1000 generates a grasp to grasp the second feature. This may be performed by the grasp generation module 310 (FIG. 3). The grasp may be based at least in part on the second feature, which may be based on the primitive shape determined for the first feature. In this manner, the primitive shape determined for the first feature can be used to identify other features on the item or the second item that will have grasps similar to the grasps determined or learned for the first feature.

Figure 11:
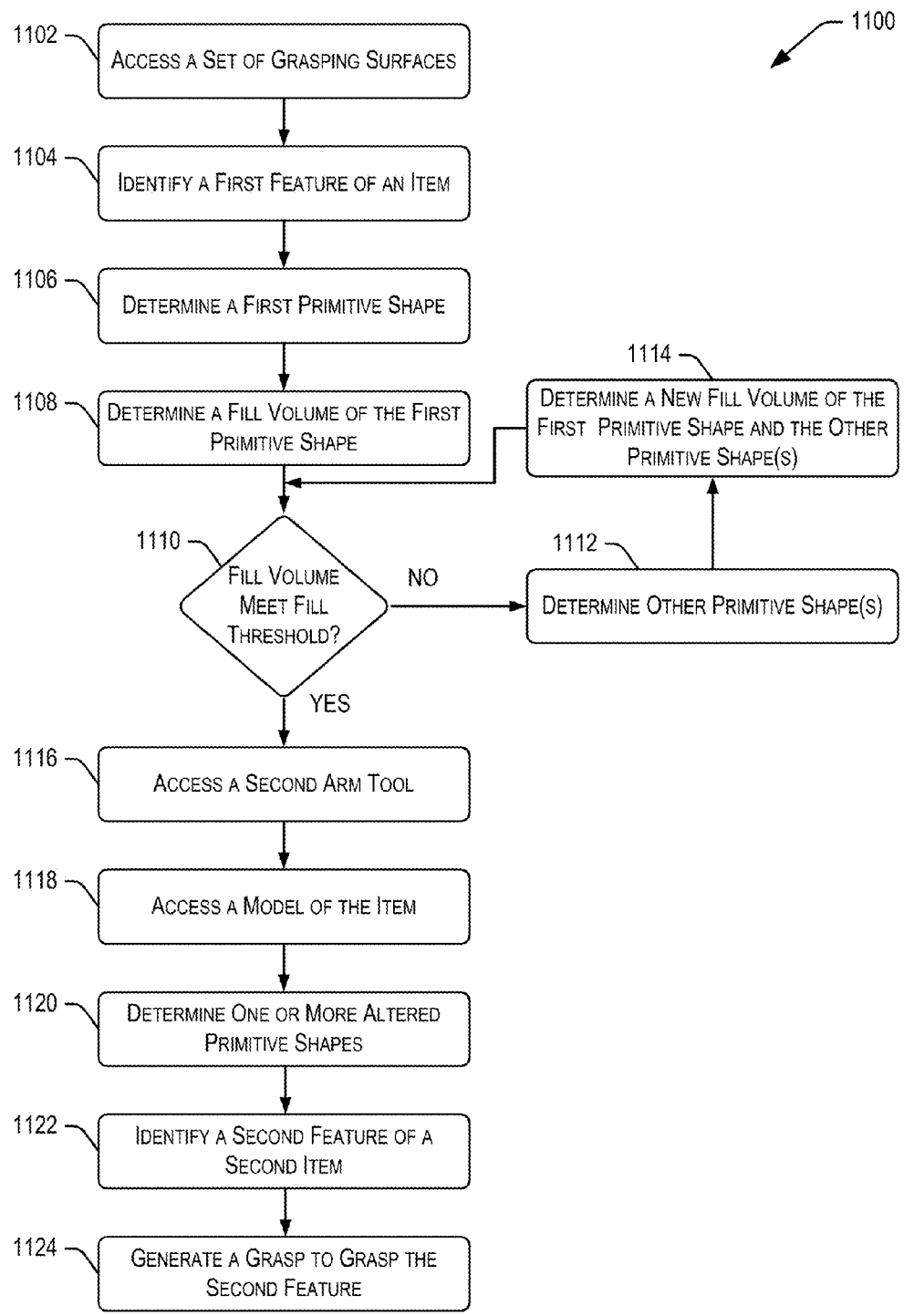
FIG. 11 is a flow diagram depicting example acts for implementing techniques relating to generating grasp sets for robotic manipulators as described herein, according to at least one example.

FIG. 11 depicts the process 1100 including example acts or techniques relating to generating a grasp for an end of arm tool to grasp a feature as described herein. The grasp management engine 220 (FIG. 2) may perform the process 1100 of FIG. 11. The process 1100 begins at 1102 by accessing a set of grasping surfaces. This may be performed by the grasp generation module 310 (FIG. 3). The set of grasping surfaces may be located on an item and correspond to a first feature of the item. In some examples, each grasping surface in the set of grasping surfaces may be representative of a set contact points on the item where a first end of arm tool of a robotic manipulator can grasp the first feature using a first grasping function. In some examples, the set of grasping surfaces may be generated based at least in part on input from a human operating the robotic manipulator. In some examples, the set of grasping surfaces are generated using a rudimentary grasp generation algorithm and refined using techniques described herein.

At 1104, the process 1100 identifies a first feature of an item. This may be performed by the feature identification module 304 (FIG. 3). The first feature may correspond to the grasping surfaces.

At 1106, the process 1100 determines a first primitive shape. This may be performed by the shape determination module 306 (FIG. 3). Determining the first primitive shape may include determining based at least in part on the set of grasping surfaces. The first primitive shape may be at least one of a cylinder, a cuboid, a sphere, a cone, a pyramid, a toroid, or any other suitable shape. In some examples, determining the primitive shape may include selecting a primitive shape that corresponds in shape and size to the feature and includes the set of grasping surfaces.

At 1108, the process 1100 determines a fill volume of the first primitive shape. This may be performed by the shape determination module 306. Determining the fill volume may include comparing a first volume of the first primitive shape with a second volume of the first feature. The first volume of the first feature may be determined based on a model of the item including the first feature. In some examples, the fill volume may be representative of how closely the first primitive shape approximates the first feature.

At 1110, the process 1100 determines whether the fill volume meets a fill threshold. This may be performed by the shape determination module 306. This determination may be made by comparing the fill volume to the fill threshold. The fill threshold may be a predetermined, learned, or computed value. If the answer at 1110 is "NO," the process 1100 proceeds to 1112 where other primitive shapes are determined. This may be performed by the shape determination module 306. The other primitive shapes may be determined in a manner that attempts to increase the fill volume. For example, instead of representing a teddy bear using one cuboid, the teddy bear may be represented by a plurality of primitive shapes that correspond to the torso, head, legs, and arms.

At 1114, the process 1100 determines a new fill volume of the first primitive shape and the other primitive shapes. This may be performed by the shape determination module 306. From 1114, the new fill volume is evaluated at 1110.

If the answer at 1110 is "YES," the process 1100 proceeds to 1116 where a second arm tool is accessed. This may be performed by the arm tool module 308 (FIG. 3). Accessing the second arm tool may include accessing information about the second arm tool. The second arm tool may have a second grasping function, which may be different from the first grasping function or related to the first grasping function. For example, the first grasping function may be a mechanical pinching function, while the second grasping function may be a suction function. As an additional example, the first grasping function may be a two-fingered mechanical pinching function, while the second grasping function may be a three-fingered mechanical pinching function. In some examples, the grasping functions may correspond to the categories to which the end of arm tools belong. The second arm tool may be accessed in order to determine a grasp for the second arm tool based on the information determined at 1102-1114.

At 1118, the process 1100 accesses a model of the item. This may be performed by the item identification module 302 (FIG. 3). The model may be representative of the item, including the first feature and other features.

At 1120, the process 1100 determines one or more altered primitive shapes. This may be performed by the shape determination module 306. Determining one or more altered primitive shapes may be based at least in part on the second end of arm tool and a relationship between the first end of arm tool and the second end of arm tool. In some examples, the relationship between the first end of arm tool and the second end of arm tool is not considered in determining the one or more altered primitive shapes. The one or more altered primitive shapes may represent larger or smaller versions of the first primitive shape and the other primitive shapes. The one or more altered primitive shapes may be defined by one or more physical limits of the second end of arm tool. The altered primitive shapes may be determined by increasing and decreasing certain dimensions of the first primitive shape and the other primitive shapes to determine the physical limits of the second end of arm tool. In some examples, the one or more altered primitive shapes may be determined for other end of arm tools in addition to the second end of arm tool.

At 1122, the process 1100 identifies a second feature of a second item. This may be performed by feature identification module 304. Identifying the second feature may be based at least in part on the model and the one or more altered primitive shapes. The second feature may correspond to the one or more altered primitive shapes. For example, if the first primitive shape representative of the first feature were a cube of width X that was grasped in its width direction, an altered primitive shape may also be a cube of width X plus five units of measure or X minus five units of measure.

At 1124, the process 1100 generates a grasp to grasp the second feature. This may be performed by the grasp generation module 310 (FIG. 3). In some examples, the grasp may be based at least in part on the second feature and for the second end of arm tool to grasp the second feature.

Figure 12:
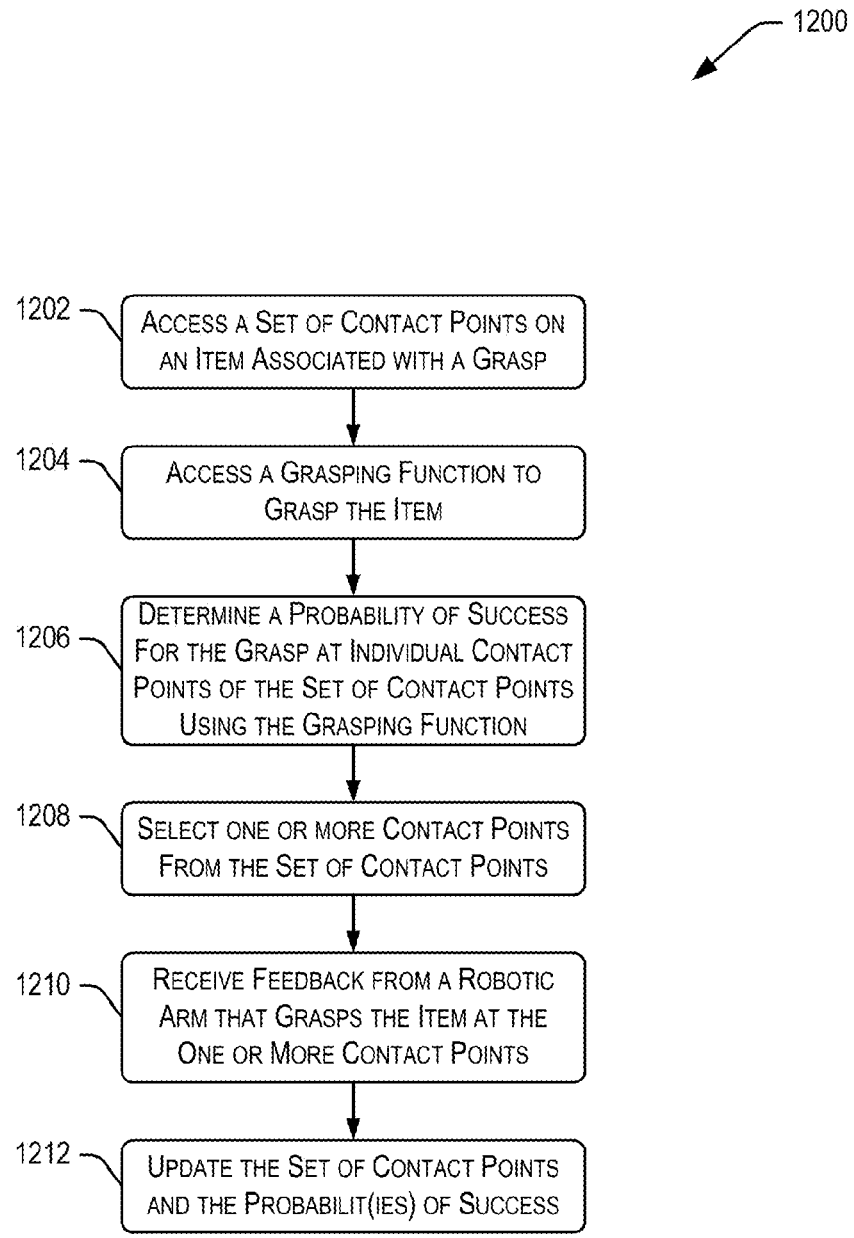
FIG. 12 is a flow diagram depicting example acts for implementing techniques relating to generating grasp sets for robotic manipulators as described herein, according to at least one example.

FIG. 12 depicts the process 1200 including example acts or techniques relating to updating probabilities of success based on a grasp set described herein. The grasp execution engine 222 (FIG. 2) may perform the process 1200 of FIG. 12. In some examples, at least a portion of the process 1200 may be performed by the grasp management engine 220 (FIG. 2). The process 1200 begins at 1202 by accessing a set of contact points on an item associated with a grasp. Accessing the set of contact points may include accessing one or more grasps that are associated with the set of contact points.

At 1204, the process 1200 accesses a grasping function to grasp the item. The grasping function may define how a particular end of arm tool functions to grasp an item. For example, a gripper may have a grasping function that includes mechanically closing two or more fingers around an item to restrain movement of the item. Similarly, a different type of gripper may function to mechanically open two or more fingers within a cavity (e.g., an inside of a vase) to restrain movement of the item along an inside surface. The grasping function may be stored in an end of arm tool database or similar location.

At 1206, the process 1200 determines a probability of success for the grasp at individual contact points of the set of contact points using the grasping function. This may include determining how likely an end of arm tool utilizing the grasping function and executing the grasp will be able to pick up the item. In some examples, probability of success may be computed for each end of arm tool and for all possible grasps on the item that can be executed by the end of arm tools. In this manner, different grasps may be compared to determine what grasp has the highest probability of being successful. In some examples, validation grasps as described herein may increase probabilities of success. For example, if a particular grasp using particular contact points has been successfully executed multiple times in either simulation, actual conditions, or both, the probability of success of that grasp may be high.

At 1208, the process 1200 selects one or more contact points from the set of contact points. For example, the one or more contact points associated with the grasp that has the highest probability of success may be selected. In some examples, the selection of the one or more contact points may be constrained by some other factor in place of or in addition to probability of success. For example, if certain contact points would result in lower energy use, would require less manipulation of the item before and/or after picking the item up, or would be executed more quickly or efficiently, this may impact the selection of the one or more contact points.

At 1210, the process 1200 receives feedback from a robotic arm that grasps the item at the one or more contact points. This may be the one or more selected contact points. The feedback may come in any suitable form. For example, the feedback may include sensing information detected by any suitable sensor associated with the robotic arm (e.g., slippage, force exerted by suction, fingers, etc., whether the item was even capable of being picked up, and any other suitable information).

At 1212, the process 1200 updates the set of contact points and the probabilities of success. This may include updating based at least in part on the feedback. For example, the feedback may indicate that the one or more contact points, while selected with high probabilities of computed, actual, or simulated success, are not ideal for grasping the item. This may be because the robotic manipulator was unable to grasp the item, the item slipped in the grasp, or any other indicator of success. This real-world feedback can be used to reduce (or increase) the probability of success for the one or more contact points. Similarly, if the robotic arm also provided feedback of a second grasp that was used to pick up the item, information about this second grasp can be used to update the probability of success for the second grasp using the robotic arm or another robotic manipulator.

Figure 13:
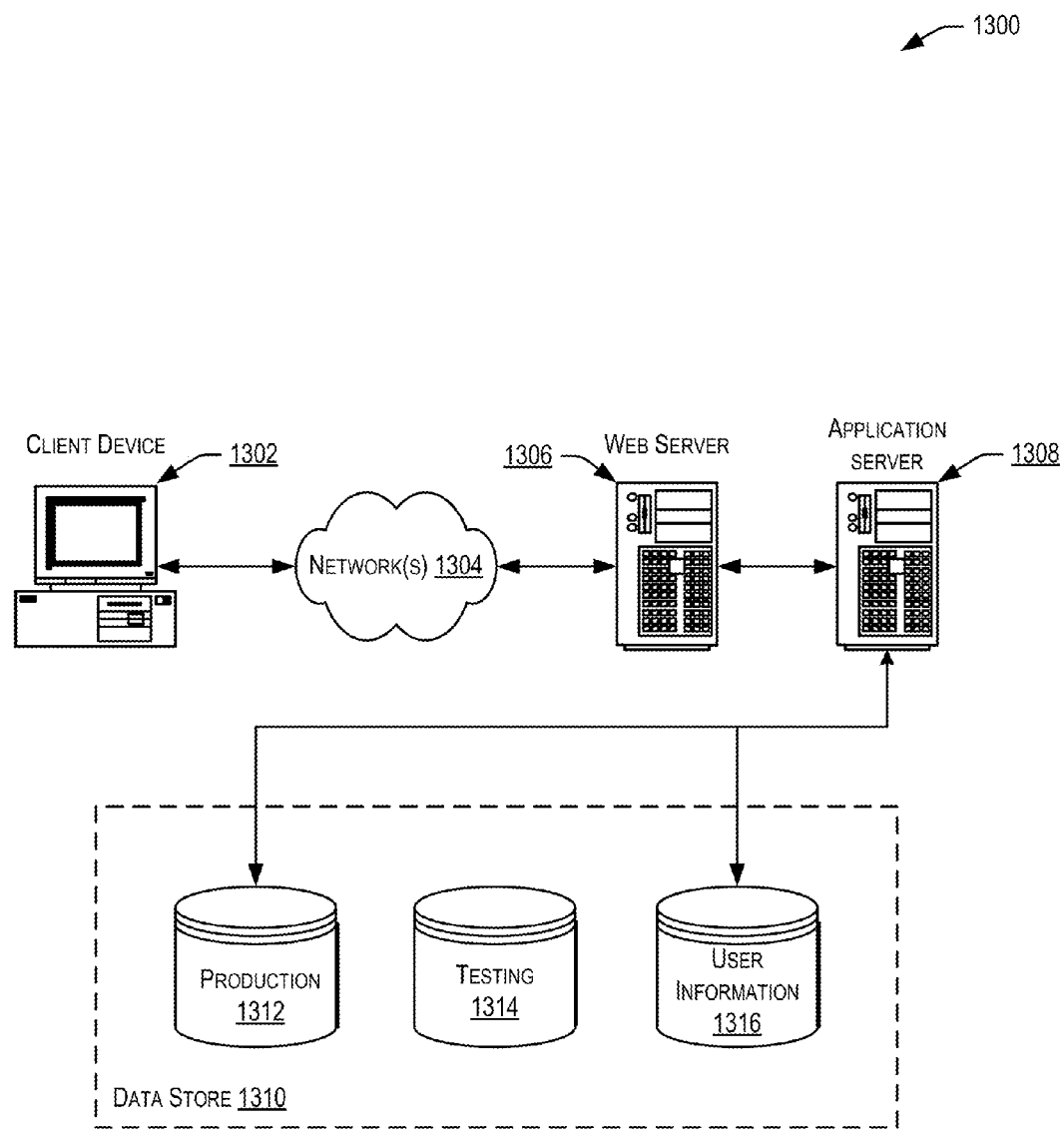
FIG. 13 is an example schematic environment for implementing techniques relating to generating and validating grasp sets for robotic manipulators as described herein, according to at least one example.

FIG. 13 illustrates aspects of an example environment 1300 for implementing aspects in accordance with various embodiments. As will be appreciated, although a Web-based environment is used for purposes of explanation, different environments may be used, as appropriate, to implement various embodiments. The environment includes an electronic client device 1302, which can include any appropriate device operable to send and receive requests, messages, or information over an appropriate network 1304 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1306 for receiving requests and serving content in response thereto, although for other networks an alternative device serving a similar purpose could be used as would be apparent to one of ordinary skill in the art.

The illustrative environment includes at least one application server 1308 and a data store 1310. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 1302 and the application server 1308, can be handled by the Web server. It should be understood that the Web and application servers are not required and are merely example components, as structured code discussed herein can be executed on any appropriate device or host machine as discussed elsewhere herein.

The data store 1310 can include several separate data tables, databases or other data storage mechanisms and media for storing data relating to a particular aspect. For example, the data store illustrated includes mechanisms for storing production data 1312 and user information 1316, which can be used to serve content for the production side. The data store also is shown to include a mechanism for storing log data 1314, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1310. The data store 1310 is operable, through logic associated therewith, to receive instructions from the application server 1308 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the client device 1302.

Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 13. Thus, the depiction of the environment 1300 in FIG. 13 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A system, comprising:
   at least one processor; and
   a memory including instructions that, when executed by the at least one processor cause the system to, at least:
      access information about a grasping surface on a first item corresponding to a first feature of the first item, the grasping surface being representative of at least one contact point on the first item where a first end of arm tool of a robotic manipulator can grasp the first feature using a first grasping function;
      determine, based at least in part on the grasping surface, a primitive shape that represents the grasping surface;
      access information about a second end of arm tool, the second end of arm tool having a second grasping function related to the first grasping function;
      determine, based at least in part on the second end of arm tool, an altered primitive shape representing a larger version or a smaller version of the primitive shape, the altered primitive shape being bounded by one or more physical limits of the second end of arm tool;
      identify, based at least in part on the altered primitive shape, a second feature of a second item, the second feature having a shape corresponding to the altered primitive shape; and
      generate, based at least in part on the second feature, a grasp for the second end of arm tool to grasp the second item at the second feature.

2. The system of claim 1, wherein the instructions, when executed by the at least one processor, further cause the system to record a spatial relationship between the primitive shape and the altered primitive shape, wherein identifying the second feature is further based at least in part on the spatial relationship.

3. The system of claim 1, wherein accessing the information about the grasping surface comprises accessing a data store that comprises information about the grasping surface that was previously developed, based at least in part on, input from a human operating the robotic manipulator utilizing the first grasping function of the first end of arm tool of the robotic manipulator to grasp the first feature at the at least one contact point.

4. The system of claim 1, wherein the instructions, when executed by the at least one processor, further cause the system to instruct the second end of arm tool to grasp the second item using the grasp.

5. The system of claim 1, further comprising the robotic manipulator including the second end of arm tool, and wherein the second end of arm tool differs from the first end of arm tool with respect to at least one of: lifting capacity, number of finger grippers, or category of end of arm tool.

6. A computer-implemented method, comprising:
   accessing, by a computer system, information about a grasping surface on a first feature of a first item, the grasping surface being representative of a first grasp including at least one contact point on the first item where a first end of arm tool of a robotic manipulator can grasp the first feature using a first grasping function;
   determining, by the computer system and based at least in part on the at least one contact point, a first primitive shape corresponding to the grasping surface;

accessing information about a second end of arm tool, the second end of arm tool having a second grasping function that is different from the first grasping function;

identifying a second feature based at least in part on a second primitive shape that corresponds to the second grasping function, the second feature having a shape that corresponds to the second primitive shape; and generating, by the computer system and based at least in part on the second feature, a second grasp for the second end of arm tool to grasp the second feature.

7. The computer-implemented method of claim 6, further comprising:

determining a fill volume of the first primitive shape by comparing a first volume of the first primitive shape with a second volume of the first feature; and in response to determining that the fill volume of the first primitive shape does not meet a fill threshold, determining a third primitive shape corresponding to the grasping surface, the grasping surface represented by the first primitive shape and the third primitive shape.

8. The computer-implemented method of claim 6, wherein the first primitive shape comprises at least one of a cylinder, cuboid, sphere, cone, toroid, or pyramid.

9. The computer-implemented method of claim 6, wherein the step of determining the first primitive shape corresponding to the grasping surface comprises:

accessing information about a training grasp where the first end of arm tool has successfully grasped the first feature of the first item at one or more contact points of the at least one contact point on the first item;

accessing a model that represents the first item;

based at least in part on the training grasp, simulating one or more other contact points on the model adjacent to the one or more contact points, the one or more other contact points being arranged so as to define the grasping surface for the first end of arm tool to grasp the first item at the one or more other contact points; and storing the grasping surface in a data structure.

10. The computer-implemented method of claim 6, wherein the second primitive shape is bounded by one or more physical limits of the second end of arm tool, and the method includes a step of determining the one or more physical limits of the second end of arm tool by:

simulating an expansion and contraction of sizes of the first primitive shape along at least one dimension that corresponds to one or more contact points of the at least one contact point on the first feature, the one or more contact points comprising one or more locations on the first feature where the first end of arm tool touches the first feature when grasping the first feature.

11. The computer-implemented method of claim 6, wherein the second grasp includes one or more contact points on the second feature that correspond to the at least one contact point, the method further comprising:

assigning a success measure to the one or more contact points of the second grasp;

selecting, based at least in part on the success measure, the second grasp from among a set of grasps generated based at least in part on the second feature;

causing the second end of arm tool to grasp the second feature in accordance with the second grasp;

receiving sensing information from the robotic manipulator describing aspects of the second end of arm tool grasping the second feature; and updating the success measure based at least in part on the sensing information.

12. The computer-implemented method of claim 6, further comprising, prior to accessing the information about the grasping surface:

accessing a set of three-dimensional scans of the first item captured by an imaging device, an orientation of the first item varied with respect to the imaging device in at least one three-dimensional scan in the set of three-dimensional scans;

identifying a third feature as a flexible feature based at least in part on the third feature being located in a first position with respect to a portion of the first item in a first three-dimensional scan and in a second position with respect to the portion of the first item in a second three-dimensional scan;

in response to identifying the third feature as the flexible feature, accessing information about the grasping surface on the first item corresponding to the first feature of the item; and using the information about the grasping surface to determine the first primitive shape.

13. The computer-implemented method of claim 6, wherein accessing information about the grasping surface comprises accessing a data store comprising information about the grasping surface that was previously developed, based at least in part on, input from a human operating the robotic manipulator utilizing the first grasping function of the first end of arm tool of the robotic manipulator to grasp the first feature at a contact point of the at least one contact point, the first feature comprising a first rigid feature flexibly connected to the first item.

14. The computer-implemented method of claim 6, wherein the second feature belongs to the first item or a second, different item.

15. A computer-implemented method, comprising:

accessing, by a computer system, information about a grasp by which an end of arm tool has successfully grasped an item at one or more contact points on the item;

accessing a model representative of the item;

based at least in part on the grasp, simulating, by the computer system, one or more other contact points on the model adjacent to the one or more contact points, the one or more other contact points being arranged so as to define a grasping surface for the end of arm tool to grasp the item at the one or more other contact points; and storing the grasping surface in a data structure.

16. The computer-implemented method of claim 15, further comprising, prior to accessing the information about the grasp, determining the grasp by:

accessing information describing a grasping function of the end of arm tool;

receiving information describing a successful attempt by a robotic manipulator to grasp the item at the one or more contact points using the grasping function in a test environment; and storing the grasp in the data structure.

17. The computer-implemented method of claim 15, further comprising:

after storing the grasping surface in the data structure, identifying a second end of arm tool that is distinct from the end of arm tool; and generating, based at least in part on the grasping surface, a second grasp for the second end of arm tool to grasp the item.

18. The computer-implemented method of claim 15, further comprising simulating the grasp to grasp the item at the one or more contact points on the item to verify that the end of arm tool can successfully grasp the item.

19. The computer-implemented method of claim 15, wherein simulating the one or more other contact points on the model adjacent to the one or more contact points comprises simulating the one or more other contact points based at least in part on physical limits of the end of arm tool.

20. The computer-implemented method of claim 15, wherein simulating the one or more other contact points on the model adjacent to the one or more contact points comprises orienting the end of arm tool in various orientations with respect to the item to simulate one or more grasps by the end of arm tool of the item at the various orientations.

* * * * *